(12) United States Patent
Ando et al.

(10) Patent No.: US 12,276,760 B2
(45) Date of Patent: Apr. 15, 2025

(54) DISTANCE-MEASURING DEVICE

(71) Applicant: Panasonic Intellectual Property Management Co., Ltd., Osaka (JP)

(72) Inventors: Takamasa Ando, Osaka (JP); Shunsuke Imai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 375 days.

(21) Appl. No.: 17/809,029

(22) Filed: Jun. 27, 2022

(65) Prior Publication Data

US 2022/0326361 A1 Oct. 13, 2022

Related U.S. Application Data

(63) Continuation of application No. PCT/JP2020/045150, filed on Dec. 4, 2020.

(30) Foreign Application Priority Data

Jan. 17, 2020 (JP) .................................. 2020-005761

(51) Int. Cl.
*G01S 7/4865* (2020.01)
*G01S 17/10* (2020.01)
*G01S 17/89* (2020.01)

(52) U.S. Cl.
CPC ............ *G01S 7/4865* (2013.01); *G01S 17/10* (2013.01); *G01S 17/89* (2013.01)

(58) Field of Classification Search
CPC ........ G01S 17/89; G01S 17/10; G01S 17/894; G01S 7/4863; G01S 7/4865
See application file for complete search history.

(56) References Cited

U.S. PATENT DOCUMENTS 6,822,687 B1 * 11/2004 Kakiuchi ............... G01S 17/894
                                                  348/E13.005
2001/0046317 A1 * 11/2001 Kamon .................... G06T 7/521
                                                  382/154

(Continued)

FOREIGN PATENT DOCUMENTS

| JP | 2007-170856 | 7/2007 |
|----|-------------|--------|
| JP | 2012-215480 | 11/2012 |

(Continued)

OTHER PUBLICATIONS

International Search Report of PCT application No. PCT/JP2020/045150 dated Feb. 22, 2021.

*Primary Examiner* — Sang H Nguyen
(74) *Attorney, Agent, or Firm* — Wenderoth, Lind & Ponack L.L.P

(57) ABSTRACT

A distance-measuring device includes a light source, a light detector, and a circuit. The circuit causes the light source to output a light pulse toward a target object, causes the light detector to detect a reflection-light pulse in a first period and a second period to generate a first signal and a second signal, respectively, and generates and outputs data indicating a distance from the light detector to the target object based on the two signals. The first period includes at least a part of a rise period, from a first point at which an intensity of the reflection-light pulse starts increasing to a second point at which the increase ends, and the first point. The second period includes at least a part of a fall period, from a third point at which the intensity starts decreasing to a fourth point at which the decrease ends, and the fourth point.

15 Claims, 15 Drawing Sheets

(56) References Cited

U.S. PATENT DOCUMENTS

| | | | |
|---|---|---|---|
| 2007/0146682 A1 | 6/2007 | Tachino et al. | |
| 2013/0162973 A1 | 6/2013 | Kamiyama et al. | |
| 2016/0097841 A1* | 4/2016 | Otani | G01S 17/10 |
| | | | 356/5.03 |
| 2016/0373652 A1 | 12/2016 | Ando et al. | |
| 2018/0135980 A1 | 5/2018 | Nakamura et al. | |
| 2018/0156899 A1* | 6/2018 | Yamada | H01L 27/14818 |
| 2018/0188360 A1* | 7/2018 | Berger | G01S 7/497 |
| 2018/0329063 A1* | 11/2018 | Takemoto | G01S 7/487 |
| 2019/0146086 A1* | 5/2019 | Sato | G01S 17/10 |
| | | | 250/206.1 |
| 2019/0179017 A1* | 6/2019 | Nagai | G01S 7/4915 |
| 2019/0208183 A1* | 7/2019 | Schmidt | G01S 17/894 |
| 2019/0331776 A1* | 10/2019 | Aotake | G01S 7/497 |
| 2020/0011972 A1* | 1/2020 | Masuda | G01S 17/894 |

FOREIGN PATENT DOCUMENTS

| | | |
|---|---|---|
| JP | 2013-134173 | 7/2013 |
| JP | 2017-009584 | 1/2017 |
| JP | 2017-032342 | 2/2017 |
| JP | 2019-039918 | 3/2019 |
| WO | 2014/207992 | 12/2014 |
| WO | 2017/013857 | 1/2017 |
| WO | 2017/018399 | 2/2017 |

* cited by examiner

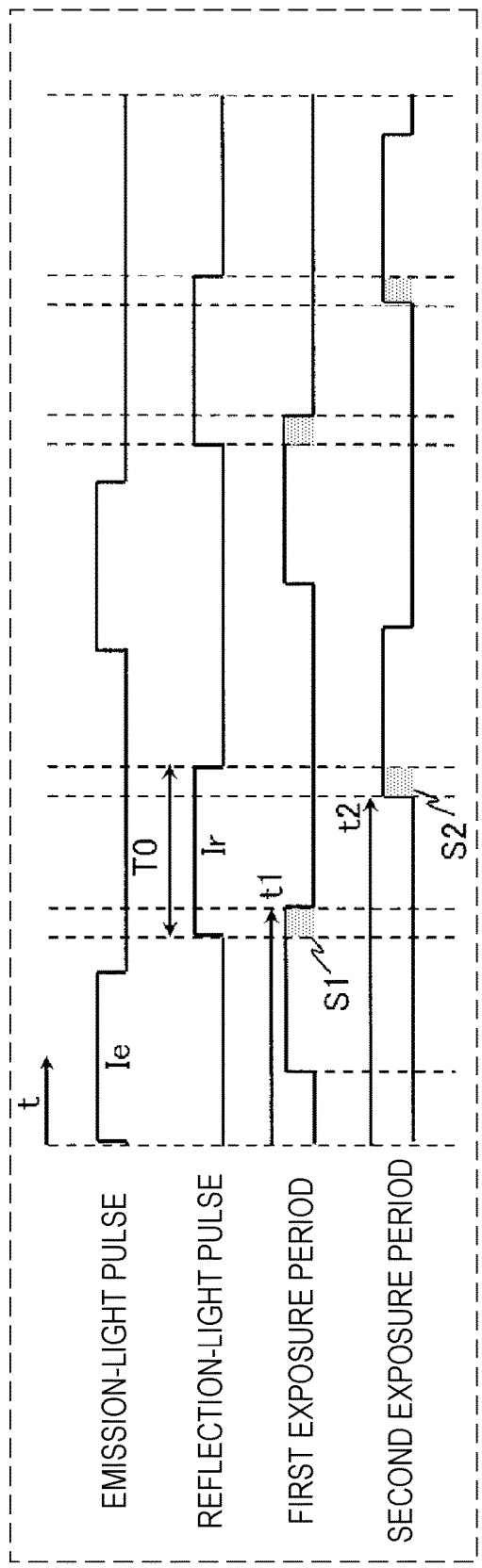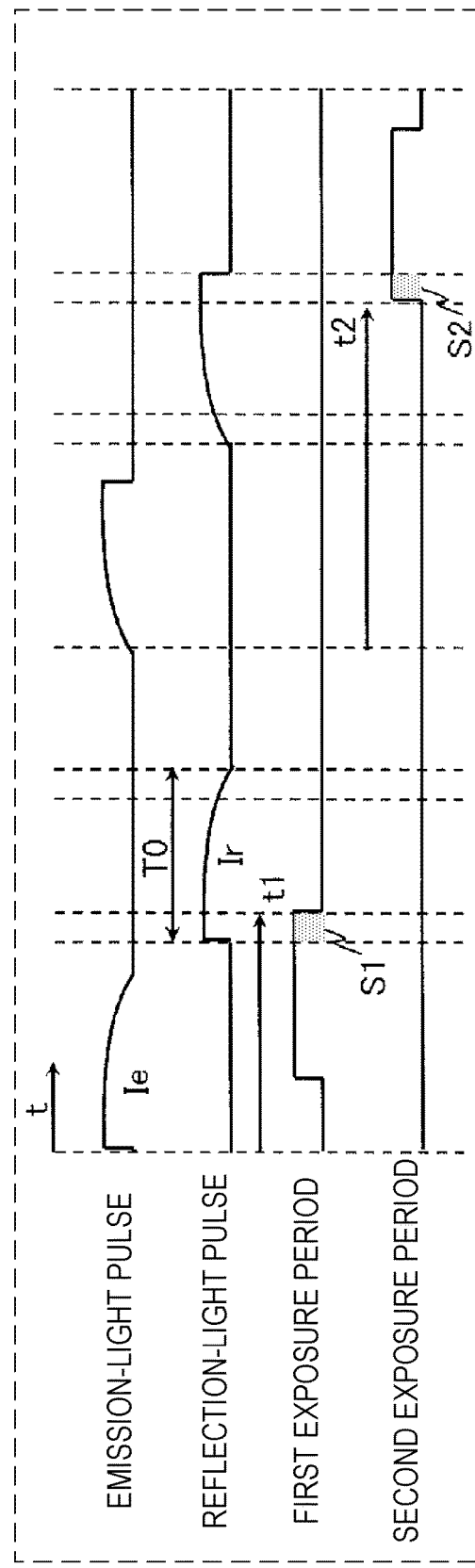

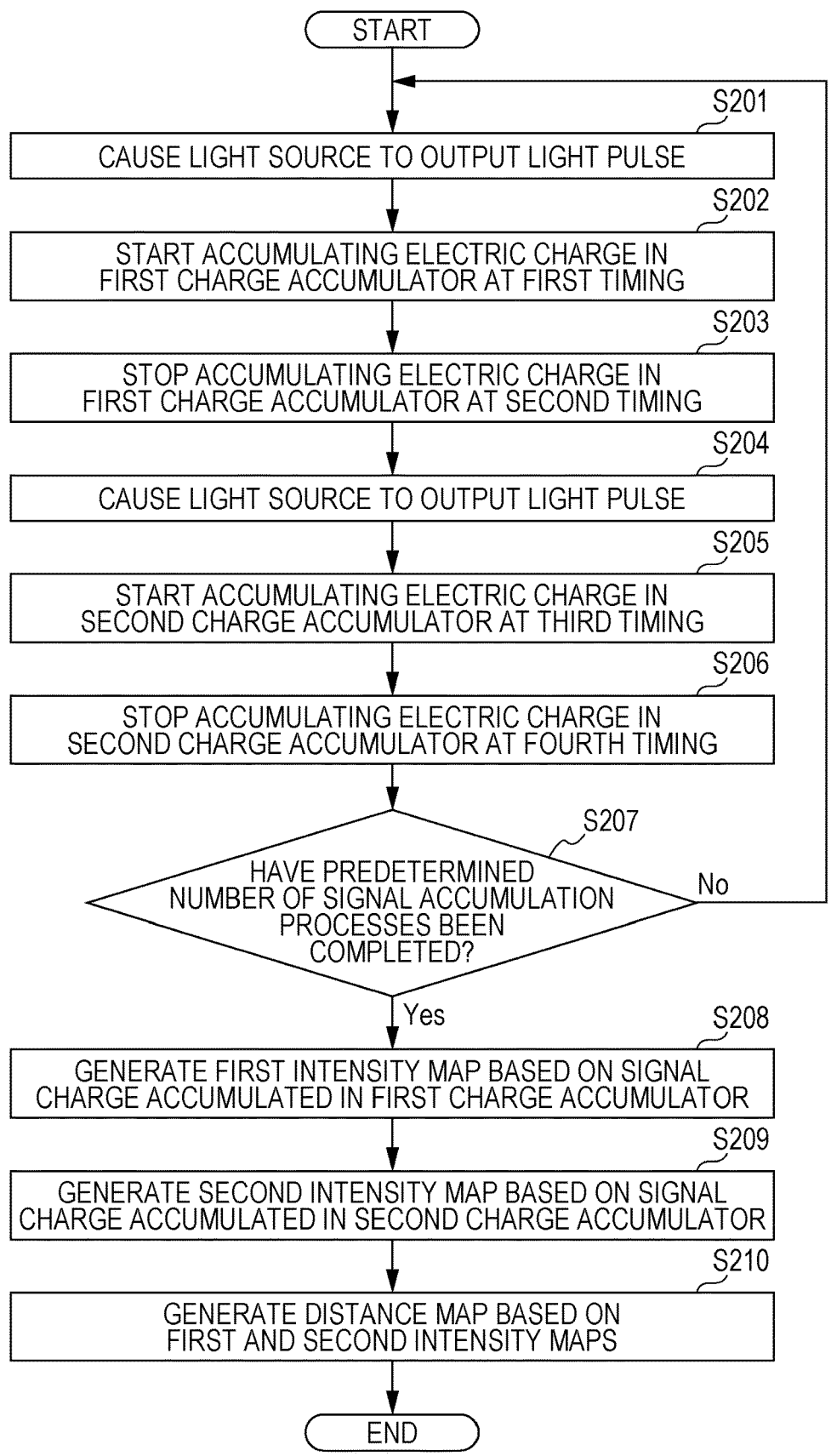

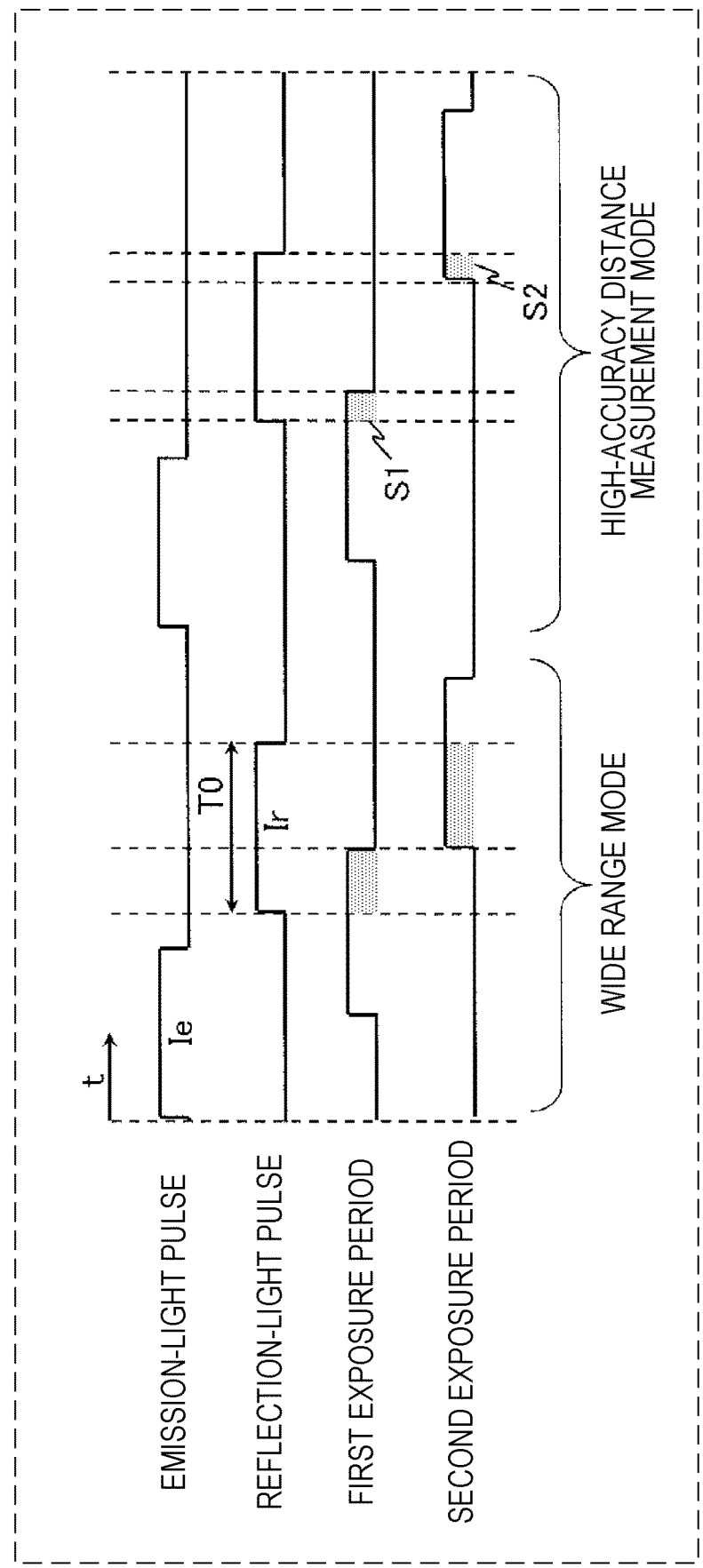

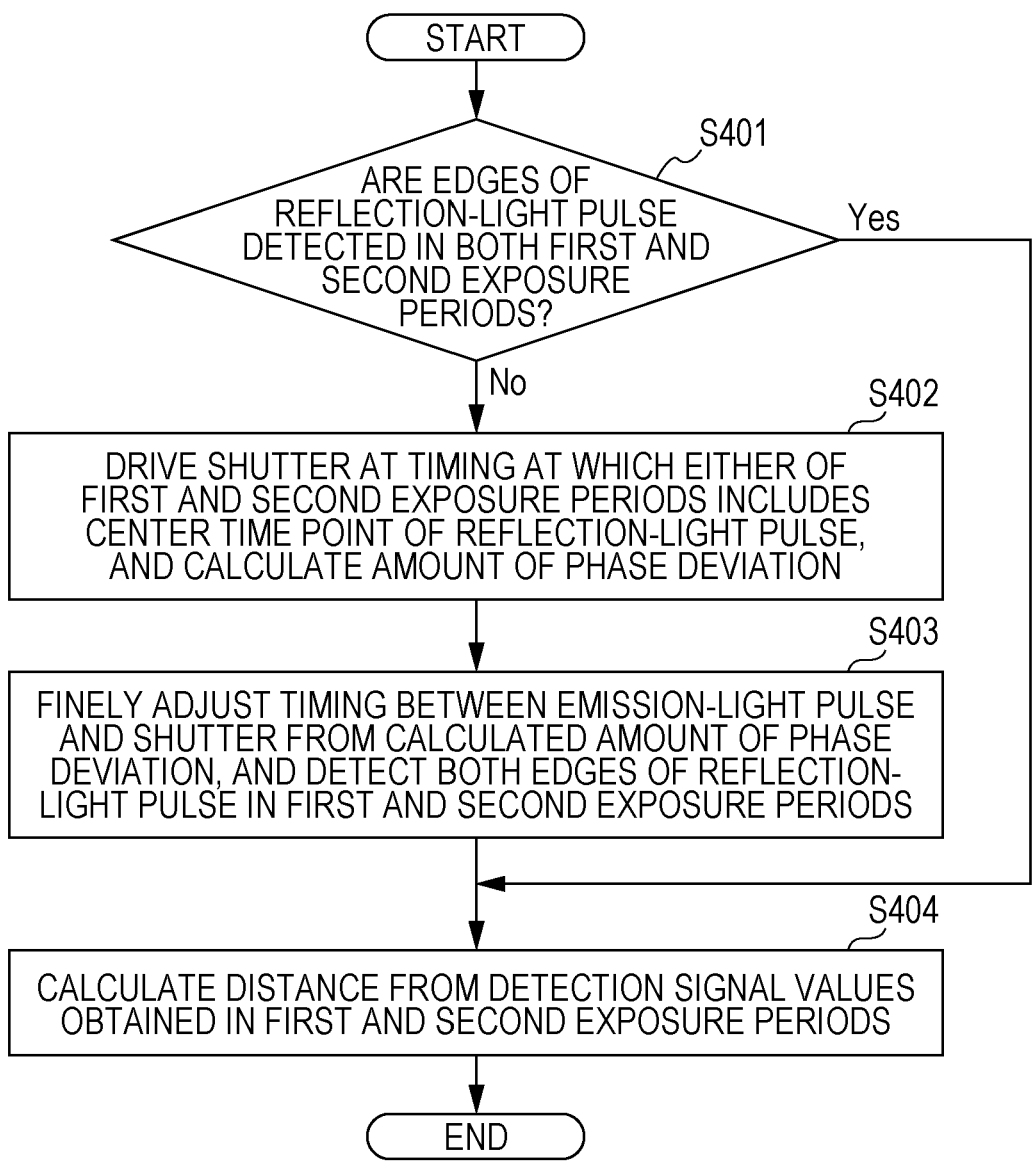

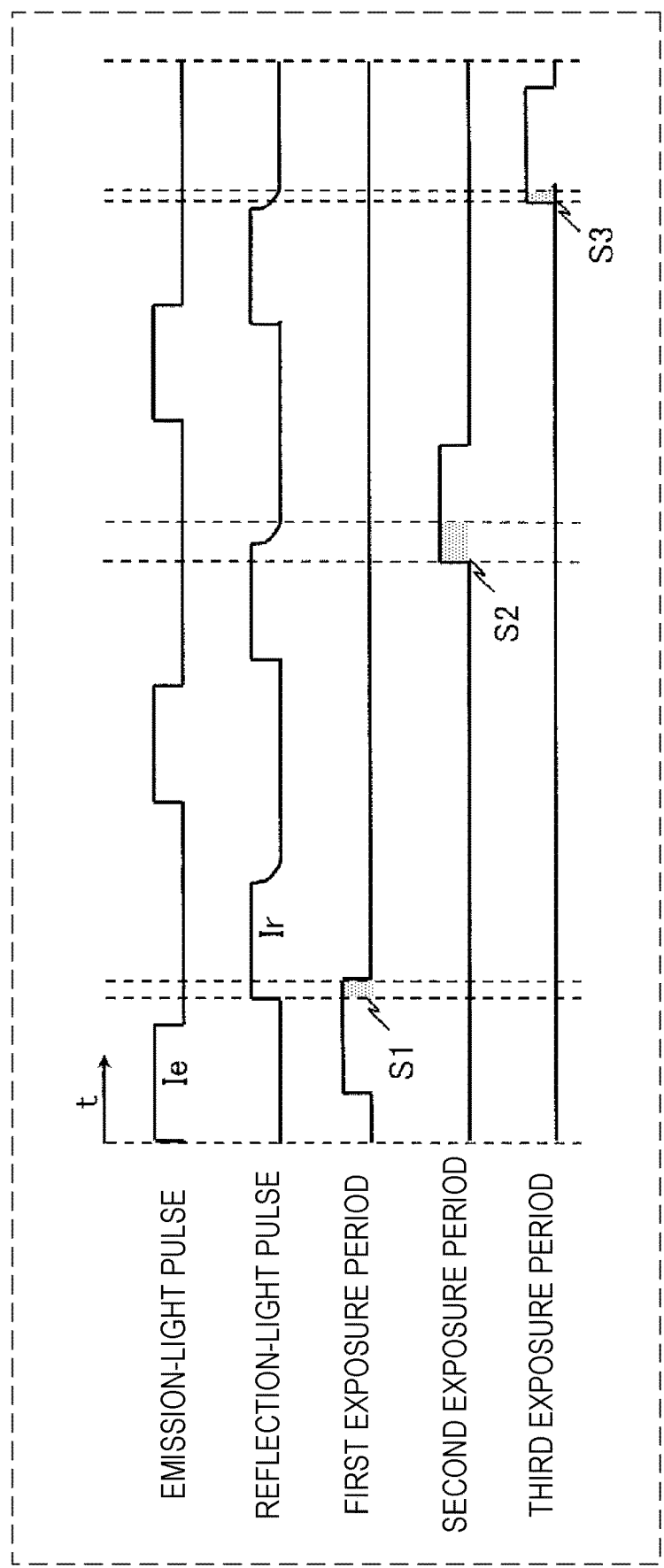

DISTANCE-MEASURING DEVICE

BACKGROUND

1. Technical Field

The present disclosure relates to distance-measuring devices.

2. Description of the Related Art

A so-called time-of-flight (TOF) based distance-measuring method proposed in the related art involves estimating the distance to a target object by using the time of flight of light. In the TOF method, a light pulse is output from a light source toward the target object, and feedback light is received by a pulse-driven sensor. In this case, the amount of light detected by the sensor varies depending on the time it takes for the feedback light to reach the sensor. Therefore, the time of flight of the light can be estimated indirectly from the variation in the amount of detected light, whereby the distance to the target object can be calculated. Various methods for enhancing the accuracy of the distance estimation in the TOF method have been proposed. For example, Japanese Unexamined Patent Application Publication No. 2017-32342 discloses a method for enhancing the distance-measurement accuracy by detecting a duty deviation in a light-emission waveform in advance and correcting the amount of deviation.

SUMMARY

One non-limiting and exemplary embodiment provides a technique for further improving the accuracy of TOF-based distance measurement using a light pulse.

In one general aspect, the techniques disclosed here feature a distance-measuring device including a light source, a light detector, and a circuit that controls the light source and the light detector. The circuit causes the light source to output a light pulse toward a target object. The circuit causes the light detector to generate a first signal by causing the light detector to detect a reflection-light pulse in a first period including at least a part of a rise period and a first time point. The rise period extends from the first time point at which an intensity of the reflection-light pulse occurring from the target object due to the light pulse starts increasing to a second time point at which the increase ends. The circuit causes the light detector to generate a second signal by causing the light detector to detect the reflection-light pulse in a second period after the first period ends. The second period includes at least a part of a fall period and a fourth time point. The fall period extends from a third time point at which the intensity of the reflection-light pulse starts decreasing to the fourth time point at which the decrease ends. The circuit generates data indicating a distance from the light detector to the target object based on the first signal and the second signal and outputs the data.

According to the present disclosure, the distance to the target object can be measured with higher accuracy than in the related art.

General or specific aspects of the present disclosure may be implemented as a system, a device, a method, an integrated circuit, a computer program, or a storage medium, such as a computer-readable storage disk, or may be implemented as a freely-chosen combination of a system, a device, a method, an integrated circuit, a computer program, and a storage medium. The computer-readable storage medium may include a nonvolatile storage medium, such as a CD-ROM (compact disc-read only memory). The device may be constituted of one or more devices. If the device is constituted of two or more devices, the two or more devices may be disposed within a single apparatus, or may be disposed separately within two or more separate apparatuses. In this description and the claims, the term "device" may refer not only to a single device but also to a system formed of devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3A illustrates an example of an emission-light pulse, a reflection-light pulse, and a shutter timing;

FIG. 3B illustrates another example of the emission-light pulse, the reflection-light pulse, and the shutter timing;

FIG. 4B is a flowchart illustrating another example of the operation of the electronic circuit;

FIG. 5 illustrates a driving method according to a second embodiment;

FIG. 6 is a flowchart illustrating an example of the operation of the electronic circuit according to the second embodiment;

FIG. 9 illustrates an example where the distance-measuring device detects a light component scattered under the skin of the target object, in addition to performing distance measurement;

DETAILED DESCRIPTIONS

First Item

Figure 1:
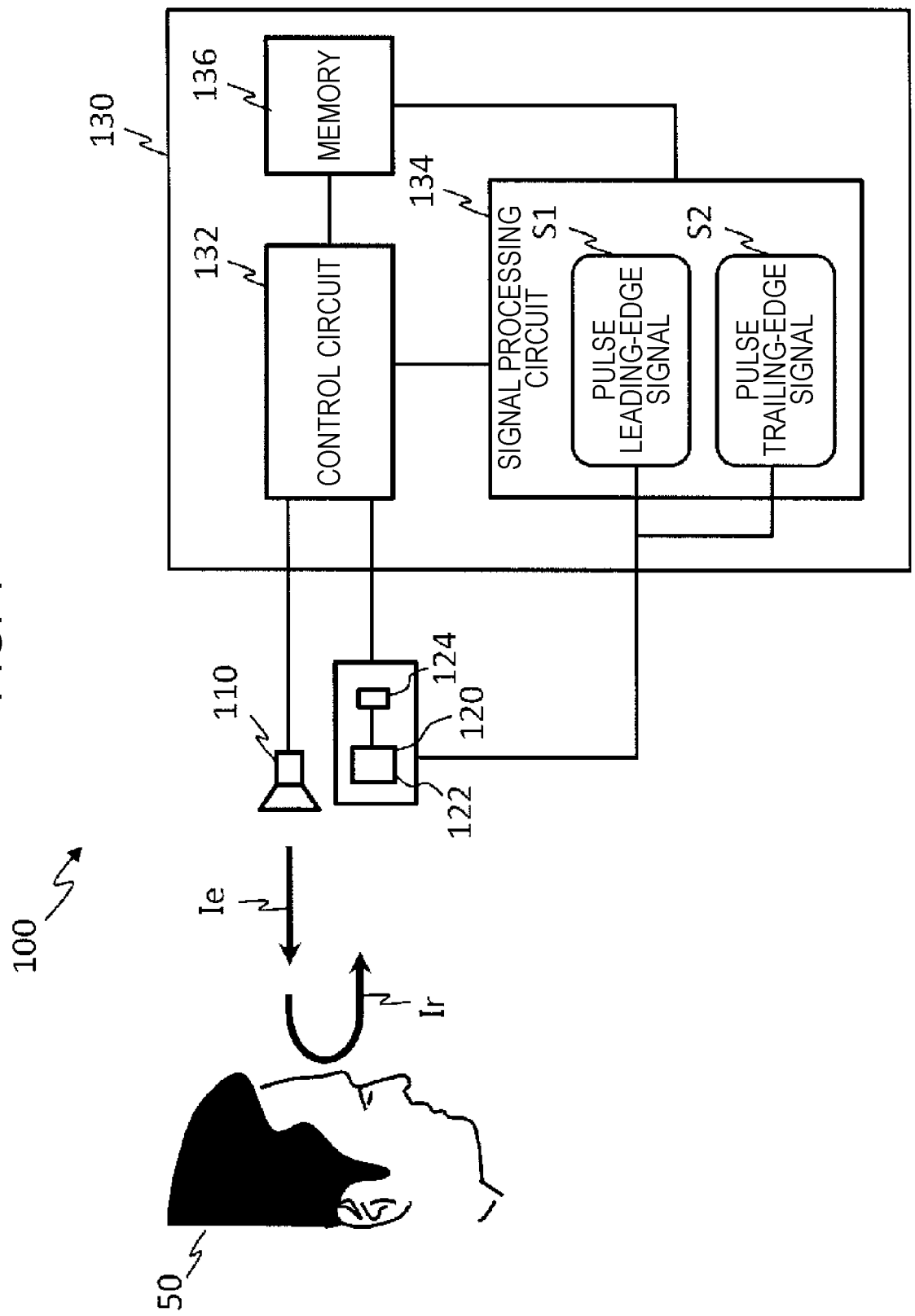
FIG. 1 schematically illustrates a state where a distance-measuring device according to a first embodiment captures an image of a target object.

A distance-measuring device according to a first item of the present disclosure includes a light source, a light detector, and a circuit that controls the light source and the light detector. The circuit causes the light source to output a light pulse toward a target object. The circuit causes the light detector to generate a first signal by causing the light detector to detect a reflection-light pulse in a first period including at least a part of a rise period and a first time point. The rise period extends from the first time point at which an intensity of the reflection-light pulse occurring from the target object due to the light pulse starts increasing to a second time point at which the increase ends. The circuit causes the light detector to generate a second signal by causing the light detector to detect the reflection-light pulse in a second period after the first period ends. The second period includes at least a part of a fall period and a fourth time point. The fall period extends from a third time point at which the intensity of the reflection-light pulse starts decreasing to the fourth time point at which the decrease ends. The circuit generates data indicating a distance from the light detector to the target object based on the first signal and the second signal and outputs the data.

Second Item

In the distance-measuring device according to the first item, the first period may end prior to a midpoint between the first time point and the fourth time point, and the second period may begin later than the midpoint.

Third Item

In the distance-measuring device according to the first or second item, the light pulse may have a pulse width that is greater than or equal to 3 ns and less than or equal to 30 ns.

Fourth Item

In the distance-measuring device according to any one of the first to third items, T0/3<(t2−t1)<T0 may be satisfied, where t1 denotes a time period from when the output of the light pulse starts to when the first period ends, t2 denotes a time period from when the output of the light pulse starts to when the second period begins, and T0 denotes a pulse width of the light pulse.

Fifth Item

In the distance-measuring device according to any one of the first to fourth items, the first period may end prior to the second time point, and the second period may begin later than the third time point.

Sixth Item

In the distance-measuring device according to any one of the first to fifth items, a timing at which the first period begins may be different from a timing at which the output of the light pulse starts, or a timing at which the second period begins may be different from a timing at which the output of the light pulse ends.

Seventh Item

A distance-measuring device according to a seventh item of the present disclosure includes a light source, a light detector, and a circuit that controls the light source and the light detector. The circuit causes the light source to output a first light pulse and a second light pulse toward a target object. The circuit causes the light detector to generate a first signal by causing the light detector to detect a first reflection-light pulse in a first period including at least a part of a rise period and a first time point. The rise period extends from the first time point at which an intensity of the first reflection-light pulse occurring from the target object due to the first light pulse starts increasing to a second time point at which the increase ends. The circuit causes the light detector to generate a second signal by causing the light detector to detect a second reflection-light pulse in a second period including at least a part of a first fall period and a fourth time point. The first fall period extends from a third time point at which an intensity of the second reflection-light pulse occurring from the target object due to the second light pulse starts decreasing to the fourth time point at which the decrease ends. The circuit generates data indicating a distance from the light detector to the target object based on the first signal and the second signal and outputs the data.

Eighth Item

In the distance-measuring device according to the seventh item, the first period may end prior to a midpoint between the first time point and a time point at which a decrease in the intensity of the first reflection-light pulse ends, and the second period may begin later than a midpoint between a time point at which the intensity of the second reflection-light pulse starts increasing and the fourth time point.

Ninth Item

In the distance-measuring device according to the seventh or eighth item, each of the first light pulse and the second light pulse may have a pulse width that is greater than or equal to 3 ns and less than or equal to 30 ns.

Tenth Item

In the distance-measuring device according to any one of the seventh to ninth items, T0/3<(t2−t1)<T0 may be satisfied, where t1 denotes a time period from when the output of the first light pulse starts to when the first period ends, t2 denotes a time period from when the output of the second light pulse starts to when the second period begins, and T0 denotes a pulse width of each of the first light pulse and the second light pulse.

Eleventh Item

In the distance-measuring device according to any one of the seventh to tenth items, the first period may end prior to the second time point, and the second period may begin later than the third time point.

Twelfth Item

In the distance-measuring device according to any one of the seventh to eleventh items, a timing at which the first period begins may be different from a timing at which the output of the first light pulse starts, or a timing at which the second period begins may be different from a timing at which the output of the second light pulse ends.

Thirteenth Item

In the distance-measuring device according to any one of the seventh to twelfth items, the target object may be a biological organism, the light source may further output a third light pulse toward the target object, the light detector may further detect a third reflection-light pulse returning from the target object and occurring due to the third light pulse, the circuit may cause the light detector to output a third signal by causing the light detector to detect the third reflection-light pulse in a third period including at least a part of a second fall period, extending from a fifth time point at which an intensity of the third reflection-light pulse starts decreasing to a sixth time point at which the decrease ends, and the sixth time point, a length from a beginning of the third period to the sixth time point may be smaller than a length from a beginning of the second period to the fourth time point, and the circuit may generate biological information of the target object based on the third signal and output the biological information.

Fourteenth Item

A signal processing device according to a fourteenth item of the present disclosure includes at least one processor and a memory that stores a computer program to be executed by the at least one processor. The at least one processor executes the computer program to perform a process including:

causing a light source to output a light pulse toward a target object;

causing a light detector to generate a first signal by causing the light detector to detect a reflection-light pulse in a first period including at least a part of a rise period, extending from a first time point at which an intensity of the reflection-light pulse occurring from the target object due to the light pulse starts increasing to a second time point at which the increase ends, and the first time point;

causing the light detector to generate a second signal by causing the light detector to detect the reflection-light pulse in a second period that comes after an end of the first period and that includes at least a part of a fall period, extending from a third time point at which the intensity of the reflection-light pulse starts decreasing to a fourth time point at which the decrease ends, and the fourth time point; and generating data indicating a distance from the light detector to the target object based on the first signal and the second signal and outputting the data.

Fifteenth Item

A signal processing device according to a fifteenth item of the present disclosure includes at least one processor and a memory that stores a computer program to be executed by the at least one processor. The at least one processor executes the computer program to perform a process including:

causing a light source to output a first light pulse and a second light pulse toward a target object;

causing a light detector to generate a first signal by causing the light detector to detect a first reflection-light pulse in a first period including at least a part of a rise period, extending from a first time point at which an intensity of the first reflection-light pulse occurring from the target object due to the first light pulse starts increasing to a second time point at which the increase ends, and the first time point;

causing the light detector to generate a second signal by causing the light detector to detect a second reflection-light pulse in a second period including at least a part of a fall period, extending from a third time point at which an intensity of the second reflection-light pulse occurring from the target object due to the second light pulse starts decreasing to a fourth time point at which the decrease ends, and the fourth time point; and generating data indicating a distance from the light detector to the target object based on the first signal and the second signal and outputting the data.

Sixteenth Item

A computer program according to a sixteenth item of the present disclosure causes a computer to execute a process including:

causing a light source to output a light pulse toward a target object;

causing a light detector to generate a first signal by causing the light detector to detect a reflection-light pulse in a first period including at least a part of a rise period, extending from a first time point at which an intensity of the reflection-light pulse occurring from the target object due to the light pulse starts increasing to a second time point at which the increase ends, and the first time point;

causing the light detector to generate a second signal by causing the light detector to detect the reflection-light pulse in a second period that comes after an end of the first period and that includes at least a part of a fall period, extending from a third time point at which the intensity of the reflection-light pulse starts decreasing to a fourth time point at which the decrease ends, and the fourth time point; and generating data indicating a distance from the light detector to the target object based on the first signal and the second signal and outputting the data.

Seventeenth Item

A computer program according to a seventeenth item of the present disclosure causes a computer to execute a process including:

causing a light source to output a first light pulse and a second light pulse toward a target object;

causing a light detector to generate a first signal by causing the light detector to detect a first reflection-light pulse in a first period including at least a part of a rise period, extending from a first time point at which an intensity of the first reflection-light pulse occurring from the target object due to the first light pulse starts increasing to a second time point at which the increase ends, and the first time point;

causing the light detector to generate a second signal by causing the light detector to detect a second reflection-light pulse in a second period including at least a part of a fall period, extending from a third time point at which an intensity of the second reflection-light pulse occurring from the target object due to the second light pulse starts decreasing to a fourth time point at which the decrease ends, and the fourth time point; and generating data indicating a distance from the light detector to the target object based on the first signal and the second signal and outputting the data.

Eighteenth Item

A non-transitory computer-readable recording medium according to an eighteenth item of the present disclosure stores the computer program according to the sixteenth item.

Nineteenth Item

A non-transitory computer-readable recording medium according to a nineteenth item of the present disclosure stores the computer program according to the seventeenth item.

Embodiments to be described below indicate general or specific examples. Numerical values, shapes, materials, components, positions and connection methods of the components, steps, and the sequence of the steps are examples and are not intended to limit the technique of the present disclosure. Of the components in the following embodiments, a component not defined in the independent claim indicating the most generic concept is described as a freely-chosen component. The drawings are not necessarily exact illustrations. Furthermore, in the drawings, same reference signs are given to substantially identical components, and redundant descriptions may sometimes be omitted or simplified.

In the present disclosure, each circuit, unit, device, member, or section or each functional block in each block diagram may entirely or partially be implemented by, for example, one or more electronic circuits containing a semiconductor device, semiconductor IC (integrated circuit), or LSI (large scale integration). The LSI or the IC may be integrated in a single chip or may be configured by combining chips. For example, the functional blocks excluding storage elements may be integrated in a single chip. Although the terms "LSI" and "IC" are used here, the terms used may change depending on the degree of integration, such that so-called "system LSI", "VLSI" (very large scale integration), or "VLSI" (ultra large scale integration) may be used. A field programmable gate array (FPGA) to be programmed after the LSI is manufactured, or a reconfigurable logic device that can reconfigure the connection relationship inside the LSI or can set up the circuit sections inside the LSI can also be used for the same purpose.

Furthermore, the function or operation of each circuit, unit, device, member, or section may entirely or partially be implemented by software processing. In this case, the software is stored in a non-transitory storage medium, such as one or more ROM (read-only memory) units, an optical disk, or a hard disk drive. When the software is executed by a processor, a function specified by the software is implemented by the processor and a peripheral device. A system or a device may include one or more non-transitory storage media storing the software, a processor, and a required hardware device, such as an interface.

First, the general outline of the embodiments of the present disclosure will be described.

A distance-measuring device according to an exemplary embodiment of the present disclosure includes a light source, a light detector, and a circuit that controls the light source and the light detector. The circuit executes the following processes (a) to (d).

(a) The light source is caused to output a light pulse.

(b) The light detector is caused to generate a first signal by detecting a reflection-light pulse in a first period including at least a part of a rise period, extending from a first time point at which the intensity of the reflection-light pulse occurring from a target object due to the light pulse starts increasing to a second time point at which the increase ends, and the first time point.

(c) The light detector is caused to generate a second signal by detecting the reflection-light pulse in a second period that comes after the end of the first period and that includes at least a part of a fall period, extending from a third time point at which the intensity of the reflection-light pulse starts decreasing to a fourth time point at which the decrease ends, and the fourth time point.

(d) Data indicating the distance to the target object is generated based on the first signal and the second signal and is output.

According to the above configuration, the light detector generates the first signal indicating a component of a leading-edge portion including the leading edge of the reflection-light pulse at least including the first time point at which the rise period of the reflection-light pulse begins, and also generates the second signal indicating a component of a trailing-edge portion including the trailing edge of the reflection-light pulse at least including the fourth time point at which the fall period of the reflection-light pulse ends. Then, the circuit calculates or estimates the distance to the target object based on the first signal and the second signal. As a result of this operation, the accuracy of distance measurement can be enhanced, as will be described in detail later.

The first period may end prior to a midpoint between the first time point and the fourth time point. The second period may begin later than the midpoint. Accordingly, a component of the midpoint where the intensity of the reflection-light pulse is high is not included in the first signal and the second signal. Consequently, the accuracy of the distance measurement can be further enhanced.

The pulse width of the light pulse may be set, for example, greater than or equal to 3 ns and less than or equal to 30 ns. The pulse width of the light pulse refers to a time length from the rise start time point to the fall end time point of the light pulse. Alternatively, the pulse width may be less than 3 ns and greater than 30 ns.

Assuming that the time period from when the output of the light pulse starts to when the first period ends is defined as $t1$, the time period from when the output of the light pulse starts to when the second period begins is defined as $t2$, and the pulse width of the light pulse is defined as $T0$, $T0/3 < (t2-t1) < T0$ may be satisfied. Alternatively, $T0/2 < (t2-t1) < T0$ may be satisfied. In a case where these conditions are satisfied, the accuracy of the distance measurement can be further enhanced.

A distance-measuring device according to another embodiment of the present disclosure includes a light source, a light detector, and a circuit that controls the light source and the light detector. The circuit executes the following processes (a') to (d').

(a') The light source is caused to output a first light pulse and a second light pulse.

(b') The light detector is caused to generate a first signal by detecting a first reflection-light pulse in a first period including at least a part of a rise period, extending from a first time point at which the intensity of the first reflection-light pulse occurring from a target object due to the first light pulse starts increasing to a second time point at which the increase ends, and the first time point.

(c') The light detector is caused to generate a second signal by detecting a second reflection-light pulse in a second period including at least a part of a fall period, extending from a third time point at which the intensity of the second reflection-light pulse occurring from the target object due to the second light pulse starts decreasing to a fourth time point at which the decrease ends, and the fourth time point.

(d') Data indicating the distance to the target object is generated based on the first signal and the second signal and is output.

According to the above configuration, the light detector generates the first signal indicating a component of a leading-edge portion of the first reflection-light pulse at least including the first time point at which the rise period of the first reflection-light pulse begins, and also generates the second signal indicating a component of a trailing-edge portion of the second reflection-light pulse at least including the fourth time point at which the fall period of the second reflection-light pulse ends. Then, the circuit calculates or estimates the distance to the target object based on the first signal and the second signal. As a result of this operation, the accuracy of distance measurement can be enhanced, as will be described in detail later.

The first period may end prior to a midpoint between the first time point and a time point at which the decrease in the intensity of the first reflection-light pulse ends. The second period may begin later than a midpoint between a time point at which the intensity of the second reflection-light pulse starts increasing and the fourth time point. Accordingly, a component of a midpoint where the intensity of a reflection-light pulse is high is not included in the first signal and the second signal. Consequently, the accuracy of the distance measurement can be further enhanced.

The pulse width of each of the first light pulse and the second light pulse may be set, for example, greater than or equal to 3 ns and less than or equal to 30 ns. Alternatively, the pulse width of each light pulse may be set to a value outside the aforementioned range.

Assuming that the time period from when the output of the first light pulse starts to when the first period ends is defined as t1, the time period from when the output of the second light pulse starts to when the second period begins is defined as t2, and the pulse width of each light pulse is defined as T0, $T0/3 < (t2-t1) < T0$ may be satisfied. Alternatively, $T0/2 < (t2-t1) < T0$ may be satisfied. In a case where these conditions are satisfied, the accuracy of the distance measurement can be further enhanced.

The target object may be, for example, a biological organism. A biological organism includes a human and an animal. In one example, the target object is the head of a person, and the circuit generates data indicating a distance distribution of the face of the person.

The light source may further output a third light pulse toward the target object. The light detector may further detect a third reflection-light pulse returning from the target object and occurring due to the third light pulse. The circuit may cause the light detector to output a third signal by causing the light detector to detect the third reflection-light pulse in a third period including at least a part of a fall period, extending from a fifth time point at which the intensity of the third reflection-light pulse starts decreasing to a sixth time point at which the decrease ends, and the sixth time point. The length from the beginning of the third period to the sixth time point may be set to a value smaller than the length from the beginning of the second period to the fourth time point. The circuit may generate biological information of the target object based on the third signal and output the biological information.

According to the above configuration, the biological information based on a component of the trailing edge of the third reflection-light pulse in addition to the distance information of the target object can be acquired with high accuracy. A component of the trailing edge of a reflection-light pulse includes a component of light returning after being scattered under the skin of the target object. By detecting such a component, for example, biological information, such as a blood-vessel distribution, of the target object can be acquired.

A signal processing device according to another embodiment of the present disclosure includes at least one processor and a memory that stores a computer program to be executed by the at least one processor. The processor executes the computer program to execute functions of the circuit according to any one of the above-described examples.

The present disclosure includes a computer program that defines the functions of the above-described circuit, and also includes a control method executed by the above-described circuit.

Detailed embodiments of the present disclosure will be described below with reference to the drawings.

First Embodiment

1. Configuration

First, the configuration of a distance-measuring device 100 according to a first embodiment will be described.

FIG. 1 schematically illustrates the distance-measuring device 100 according to this embodiment. The distance-measuring device 100 includes a light source 110, an image sensor 120, and an electronic circuit 130. The image sensor 120 includes a photoelectric converter 122 and a charge accumulator 124. The electronic circuit 130 includes a control circuit 132, a signal processing circuit 134, and a memory 136. In FIG. 1, a target object 50 that is to undergo distance measurement by the distance-measuring device 100 is also illustrated. The target object 50 is the head of a person in this embodiment. The target object 50 is not limited to the head of a person, and may be a freely-chosen object.

1.1. Light Source 110

The light source 110 radiates light onto the target object 50. The light radiated from the light source 110 and reaching the target object 50 is reflected by the target object 50 and partially reaches the image sensor 120. The light source 110 generates a light pulse multiple times at predetermined time intervals or timings.

Since the target object 50 is a person, the light source 110 used in the distance-measuring device 100 according to this embodiment may be designed in view of the effect on the retinas. For example, the light source 110 used may satisfy class 1 of the laser safety standards specified in each country. In that case, the target object 50 is irradiated with low-illuminance light with an accessible emission limit (AEL) below 1 mW. Alternatively, the light source 110 itself does not have to satisfy class 1. For example, class 1 of the laser safety standards may be satisfied by disposing a diffuser or a neutral density (ND) filter in front of the light source 110 to diffuse or attenuate the light.

The light source 110 may be a general-purpose semiconductor-laser-based light source. When a general-purpose semiconductor laser is to be driven with low voltage, it becomes difficult to track on/off driving of light if the pulse width is too small. Therefore, the light-emission waveform varies for each pulse emitted and may tend to indicate unstable behavior, thus leading to variations in distance measurement results. In order to obtain a stable waveform by using a general-purpose semiconductor laser, for example, the light source 110 may be controlled to emit a light pulse with a pulse width greater than or equal to 3 ns. Alternatively, for further stabilization, the light source 110 may emit a light pulse with a pulse width greater than or equal to 5 ns, more preferably, greater than or equal to 10 ns. On the other hand, if the pulse width is too large, light leakage, that is, the parasitic light sensitivity (PLS), toward the charge accumulator 124 during a shutter-off state may increase, possibly leading to a distance measurement error. Thus, for example, the light source 110 may be controlled to emit a light pulse with a pulse width less than or equal to 50 ns. Alternatively, the light source 110 may emit a light pulse with a pulse width less than or equal to 30 ns, more preferably, less than or equal to 20 ns.

As an irradiation pattern of the light source 110, a pattern with a uniform intensity distribution within an irradiation range may be selected. In that case, the target object 50 can be irradiated with light with spatially uniform illuminance, and the intensity of a detection signal can be readily contained within a dynamic range at any of the pixels of the image sensor 120.

1.2. Image Sensor 120

The image sensor 120 is an example of a light detector that receives light output from the light source 110 and reflected from the target object 50. The image sensor 120 has two-dimensionally-arranged light detection cells, and can acquire two-dimensional information about the target object 50 at once. For example, the image sensor 120 may be a freely-chosen imaging element, such as a CCD (charge-coupled device) image sensor or a CMOS (complementary metal oxide semiconductor) image sensor. The light detector according to the present disclosure is not limited to a sensor having two-dimensionally-arranged light detection cells, and may be, for example, a sensor having one-dimensionally-arranged light detection cells. Moreover, a light detector having a single light detection element, such as a photodetector, may be used in an application where acquisition of distance information about a single spot alone is sufficient.

The image sensor 120 according to this embodiment includes an electronic shutter. The electronic shutter is a circuit that controls an exposure timing. The electronic shutter controls a single signal accumulation period for converting received light into an effective electric signal and accumulating the electric signal, as well as a period for stopping the signal accumulation. The signal accumulation period may also be referred to as "exposure period". A time period from when a single exposure period ends to when a subsequent exposure period begins may sometimes be referred to as "non-exposure period". In the following description, a state where exposure is performed may be expressed as "open state", and a state where the exposure is stopped may be expressed as "closed state".

The image sensor 120 may use the electronic shutter to adjust the exposure period and the non-exposure period in sub-nanoseconds, such as within a range of 30 ps to 1 ns. The control circuit 132 causes the light source 110 to emit a light pulse multiple times, and causes the image sensor 120 to perform exposure multiple times in synchronization with the light emission. Accordingly, signals are integrated multiple times, thereby achieving enhanced sensitivity.

A configuration example of the image sensor 120 will be described below.

The image sensor 120 includes light detection cells that are arranged two-dimensionally in an imaging plane. In this description, the light detection cells may also be referred to as "pixels". Each pixel includes a photoelectric converter, such as a photodiode, and at least one charge accumulator.

Figure 2:
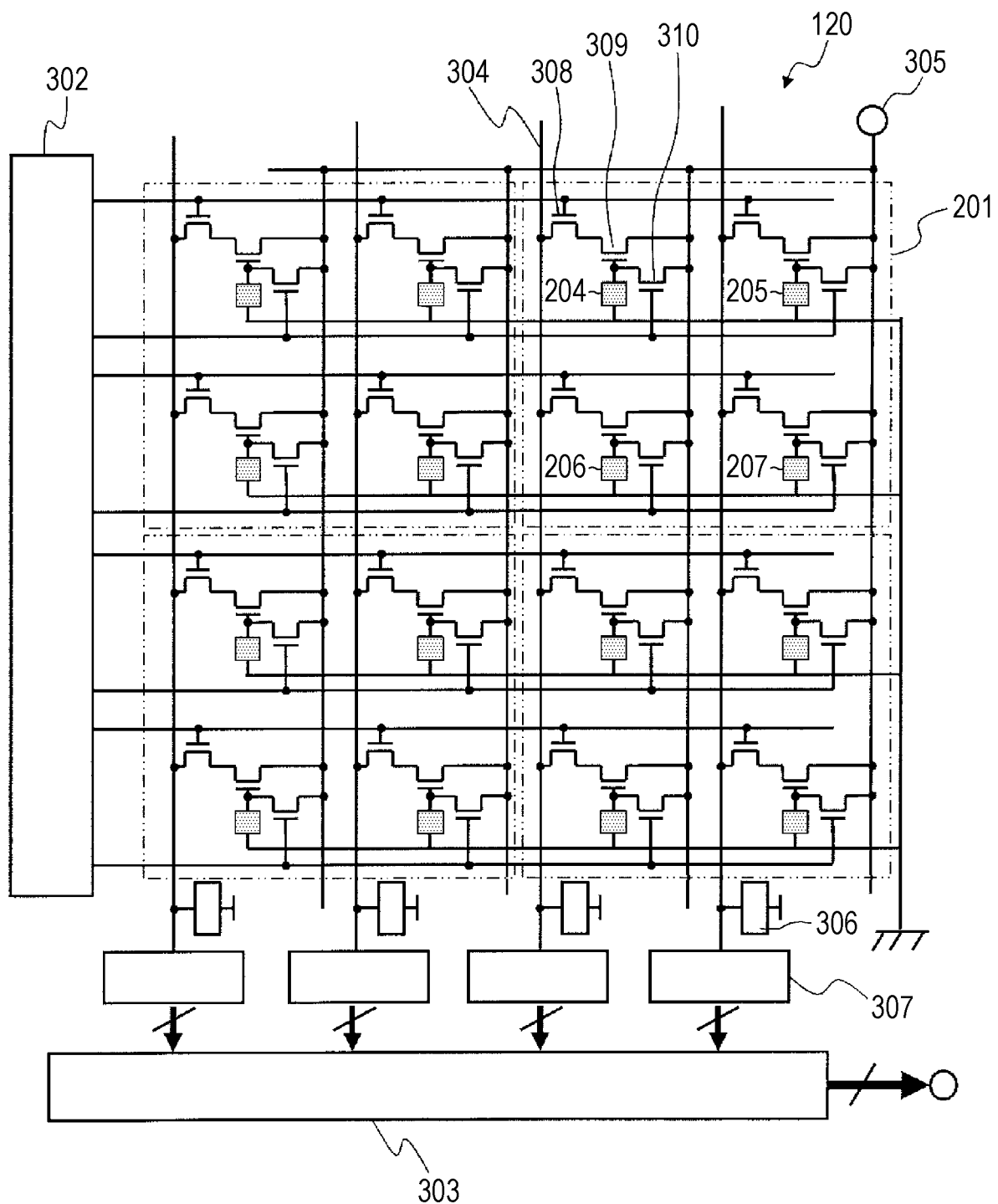
FIG. 2 illustrates an example of the configuration of an image sensor.

FIG. 2 illustrates an example of the configuration of the image sensor 120. In FIG. 2, each region surrounded by a frame indicated with a double-dot chain line corresponds to one pixel 201. Each pixel 201 includes one photodiode (not illustrated). Although only four pixels arranged in a two-row-by-two-column matrix are illustrated in FIG. 2, a larger number of pixels may be arranged in actuality. Each pixel 201 includes four floating diffusion layers 204, 205, 206, and 207. Signals accumulated in the four floating diffusion layers 204, 205, 206, and 207 are treated as if they are signals of four pixels of a normal CMOS image sensor, and are output from the image sensor 120.

Each pixel 201 has four signal detection circuits. Each signal detection circuit includes a source follower transistor 309, a row selection transistor 308, and a reset transistor 310. Each of the transistors is, for example, a field-effect transistor provided on a semiconductor substrate, but is not limited thereto. As illustrated in FIG. 2, one of an input terminal and an output terminal of the source follower transistor 309 is connected to one of an input terminal and an output terminal of the row selection transistor 308. The one of the input terminal and the output terminal of the source follower transistor 309 typically serves as a source terminal. The one of the input terminal and the output terminal of the row selection transistor 308 typically serves as a drain terminal. A gate terminal serving as a control terminal of the source follower transistor 309 is connected to a photodiode (not illustrated). A positive hole generated by the photodiode or signal charge caused by an electron is accumulated in the floating diffusion layer 204 serving as a charge accumulator between the photodiode and the source follower transistor 309.

Although not illustrated in FIG. 2, the floating diffusion layers 204 to 207 are each connected to a photodiode (not illustrated). A switch may be provided between the photodiode and each of the floating diffusion layers 204 to 207. This switch is used for switching the conductive state between the photodiode and each of the floating diffusion layers 204 to 207 in accordance with a control signal from the control circuit 132. Accordingly, the start and stoppage of the signal charge accumulation in each of the floating diffusion layers 204 to 207 are controlled. The electronic shutter according to this embodiment has a mechanism for performing such exposure control.

The signal charge accumulated in each floating diffusion layer is read as a result of the gate of the row selection transistor 308 being switched on by a row selection circuit 302. In this case, an electric current flowing into the source follower transistor 309 and a source follower load 306 from a source follower power source 305 is amplified in accordance with the signal potential of the floating diffusion layer. An analog signal according to this electric current read from a vertical signal line 304 is converted into digital signal data by an analog-digital (AD) conversion circuit 307 connected to each column. This digital signal data is read for each column by a column selection circuit 303, and is output from the image sensor 120. The row selection circuit 302 and the column selection circuit 303 perform the reading process from one row, then perform the reading process from a subsequent row, and subsequently read signal-charge information in the floating diffusion layers from all the rows in a similar manner. After reading the signal charge from all the rows, the control circuit 132 switches the gate of the reset transistor 310 to an on mode, so as to reset all the floating diffusion layers. Accordingly, an imaging process of one frame is completed. Subsequently, the frame imaging process is repeated at high speed in a similar manner, whereby the imaging process of a series of frames performed by the image sensor 120 is completed.

Although the description of this embodiment relates to an example where the image sensor 120 is of a CMOS type, the image sensor 120 may be an imaging element of another type. For example, the image sensor 120 may be a CCD, a single-photon-counting-type element, or an amplification-type image sensor, such as an electron-multiplying CCD (EMCCD) or an intensified CCD (ICCD). Furthermore, the image sensor 120 may be replaced with a sensor having singular pixels. The use of a one-pixel sensor only allows for distance measurement with respect to a single spot alone, but enables distance detection at a high rate.

1.3. Electronic Circuit 130

The electronic circuit 130 includes the control circuit 132, the signal processing circuit 134, and a storage medium, such as the memory 136. The control circuit 132 adjusts a time difference between the output timing of a light pulse from the light source 110 and the shutter timing of the image sensor 120. In this description, this time difference may also be referred to as "phase difference". The "output timing"

from the light source 110 refers to a timing at which the light pulse output from the light source 110 starts to rise. The "shutter timing" refers to a timing at which exposure starts.

The control circuit 132 may be configured to remove an offset component from a signal detected by each pixel of the image sensor 120. An offset component is a signal component caused by environmental light, such as sunlight or light from a fluorescent lamp, or ambient light. In a state where light is not output from the light source 110 by turning off the light source 110, a signal is detected by the image sensor 120, so that an offset component caused by environmental light or ambient light is estimated.

The control circuit 132 may be, for example, a processor, such as a central processing unit (CPU), or an integrated circuit, such as a microcontroller containing a processor and a memory. The control circuit 132 causes, for example, the processor to execute a computer program stored in the memory 136, so as to adjust the output timing and the shutter timing.

The signal processing circuit 134 is a circuit that processes an image signal output from the image sensor 120. The signal processing circuit 134 performs a calculation, such as image processing. The signal processing circuit 134 may be realized by, for example, a digital signal processor (DSP), a programmable logic device (PLD) such as a field programmable gate array (FPGA), a central processing unit (CPU), or a graphics processing unit (GPU). The signal processing circuit 134 causes the processor to execute the computer program stored in the memory 136, so as to execute processing to be described later. The control circuit 132 and the signal processing circuit 134 may be a single integrated circuit or may be individual separate circuits. The signal processing circuit 134 may be, for example, a component of an external device, such as a server, provided at a remote location. In this case, the external device, such as a server, uses wireless communication or wired communication to exchange data with a distance-measuring device equipped with the light source 110, the image sensor 120, and the control circuit 132. The signal processing circuit 134 executes processing for determining a specific distance to the target object 50 located within a predetermined distance range from the distance-measuring device 100 based on a signal output from the image sensor 120. Prior to this processing, the signal processing circuit 134 may estimate an offset component caused by ambient light and remove the offset component.

2. Distance-Measurement Calculation

The following description relates to an example of a method of a distance-measurement calculation executed by the electronic circuit 130 according to this embodiment.

FIG. 3A illustrates an example of an emission-light pulse, a reflection-light pulse, and a shutter timing. In the example illustrated in FIG. 3A, the distance-measuring device 100 outputs a rectangular emission-light pulse Ie from the light source 110. In order to form a rectangular pulse, the light source 110 used may be, for example, a laser diode (LD) having a steep time response characteristic. Accordingly, for example, the emission-light pulse Ie and a reflection-light pulse Ir to be output can have a rise period and a fall period that are less than or equal to 2 ns. Moreover, the emission-light pulse Ie and the reflection-light pulse Ir to be output can have a rise period and a fall period that are less than or equal to 1 ns. By outputting a rectangular emission-light pulse Ie, the relationship between a change in the amount of detection light and a change in the distance can be made linear. After being reflected by the target object 50, the emission-light pulse Ie reaches the image sensor 120 as the reflection-light pulse Ir. While the reflection-light pulse Ir is entering the image sensor 120, the control circuit 132 controls the image sensor 120 such that exposure is executed in two different exposure periods. The first exposure period begins before the reflection-light pulse Ir reaches the image sensor 120, and stops after the start of charge accumulation of a leading-edge portion including the leading edge of the reflection-light pulse Ir. The second exposure period begins after the reflection-light pulse Ir starts to reach the image sensor 120, and stops after the trailing edge of the reflection-light pulse Ir reaches the image sensor 120. In this example, the first exposure period and the second exposure period do not overlap. Specifically, the second exposure period begins after the end of the first exposure period. It is assumed that a pulse width of an emission-light pulse and a reflection-light pulse is defined as T0, a time period from when the light source 110 starts to output a light pulse to when the first exposure period ends is defined as t1, and a time period from when the light source 110 starts to output the light pulse to when the second exposure period begins is defined as t2. In this embodiment, $0 < t2-t1 < T0$ is satisfied. The control circuit 132 sends a control signal for starting the output of the emission-light pulse Ie to the light source 110, and sends a control signal for beginning the first exposure period to the image sensor 120. In this case, one of the control signals may possibly become noise against the other control signal. Thus, in order to suppress the noise, the timing for sending the control signal for starting the output of the emission-light pulse Ie may be varied from the timing for sending the control signal for beginning the first exposure period to the image sensor 120. In other words, the control circuit 132 may control the light source 110 and the image sensor 120 to vary the timing for beginning the first exposure period from the timing for starting the output of the emission-light pulse. Likewise, the control circuit 132 may control the light source 110 and the image sensor 120 to vary the timing for beginning the second exposure period from the timing for ending the output of the emission-light pulse.

As a result of the above-described operation, electric charge occurring due to the exposure of the leading-edge portion including the leading edge of the reflection-light pulse Ir is accumulated in the first exposure period. On the other hand, in the second exposure period, electric charge occurring due to the exposure of the trailing-edge portion including the trailing edge of the reflection-light pulse Ir is accumulated. It is assumed that a signal indicating an amount of electric charge accumulated in the first exposure period is defined as S1, and a signal indicating an amount of electric charge accumulated in the second exposure period is defined as S2. The intensity of each of the signals S1 and S2 changes in accordance with a distance z between the target object 50 and the image sensor 120. The distance z can be estimated by using Expression 1 indicated below:

$$z = c \frac{\{T_0 - (t_2 - t_1)\}}{2} \times \frac{S_2}{S_1 + S_2}$$

where c ($\approx 3.0 \times 10^8$ m/s) indicates the speed of light.

It is apparent from Expression 1 that the sum of S1 and S2 in the denominator is fixed relative to a phase change in the reflection-light pulse. By using Expression 1, the distance z can be changed linearly relative to a change in S2. In this embodiment, the timings for the first and second exposure periods are set such that components of the leading-edge portion and the trailing-edge portion of the reflection-light pulse Ir are acquired. Accordingly, changes in S1 and S2 relative to a change in the distance to the target object 50 are maximized, so that the distance resolution can be enhanced. From Expression 1, a distance measurement error σz can be calculated in accordance with Expression 2 indicated below by using detection errors σs1 and σs2 of S1 and S2.

$$\sigma_z = \left|\frac{\partial z}{\partial S_1}\sigma_{S1}\right| + \left|\frac{\partial z}{\partial S_2}\sigma_{S2}\right| = c\frac{\{T_0 - (t_2 - t_1)\}}{2}\frac{S_2\sigma_{S1} + S_1\sigma_{S2}}{(S_1 + S_2)^2}$$

It is apparent from Expression 2 that the distance measurement error σz can be reduced by reducing T0−(t2−t1). In this embodiment, the first exposure period and the second exposure period are set such that the components of the leading-edge portion and the trailing-edge portion of the reflection-light pulse Ir are acquired, so that T0−(t2−t1) is reduced, whereby the distance measurement error can be reduced.

The expression "the component of the leading-edge portion of the reflection-light pulse Ir is acquired" means that a component in at least a part of the rise period of the reflection-light pulse Ir is detected. The expression "the component of the trailing-edge portion of the reflection-light pulse Ir is acquired" means that a component in at least a part of the fall period of the reflection-light pulse Ir is detected. In this embodiment, a time point at which the intensity of the reflection-light pulse Ir having reached the light detector starts increasing is referred to as "first time point", a time point at which the increase in the intensity of the reflection-light pulse Ir ends is referred to as "second time point", a time point at which the intensity of the reflection-light pulse Ir starts decreasing is referred to as "third time point", and a time point at which the decrease in the intensity of the reflection-light pulse Ir ends is referred to as "fourth time point". The first exposure period includes the first time point, and the second exposure period includes the fourth time point. Accordingly, in this embodiment, the first exposure period includes a rise start time point of the reflection-light pulse Ir, and the second exposure period includes a fall end time point of the reflection-light pulse Ir. By controlling the exposure periods in this manner, the accuracy of the distance measurement can be enhanced.

The distance-measurement calculation indicated in Expression 2 is further effective especially in a case where the detection errors σs1 and σs2 are caused by illuminance fluctuations in the light source 110. This is because, as compared with an error, such as shot noise, which is proportional to the square of S1 and S2, the dependency on the signals S1 and S2 in the right term of Expression 2 decreases, thus resulting in increased dependency on T0−(t2−t1). This is due to an error caused by illuminance fluctuations being proportional to S1 and S2.

Therefore, in this embodiment, in order to acquire the components of the leading-edge portion and the trailing-edge portion of the reflection-light pulse Ir, the control circuit 132 controls the image sensor 120 such that 0<t2−t1<T0 is satisfied. The control circuit 132 may control the image sensor 120 such that T0/3<t2−t1<T0 or T0/2<t2−t1<T0 is satisfied. By performing such control, the accuracy of the distance measurement can be further enhanced. Accordingly, it is effective that the signals S1 and S2 are both components of the edges of the reflection-light pulse Ir from the standpoint of distance-measurement resolution. Therefore, the first exposure period and the second exposure period may each be set such as not to include a midpoint or peak of the reflection-light pulse Ir. A midpoint refers to a point between the rise start point and the fall end point of the reflection-light pulse Ir. By accumulating electric charge of the components at both edge portions of the reflection-light pulse Ir such that the midpoint or peak is not included, the distance measurement can be performed with even higher accuracy.

Although the effect of enhanced accuracy of the distance measurement can be achieved by reducing the pulse width T0, a shorter emission-light pulse makes it difficult to obtain a stable pulse shape. Thus, there is a limit to reducing the pulse width T0. For example, the pulse width T0 may be set greater than or equal to 3 ns, or greater than or equal to 5 ns in a certain example. Increasing the time difference (t2−t1) between the first and second exposure periods rather than reducing the pulse width T0 enables higher trackability of the electronic shutter, so that the image sensor 120 can be driven stably.

The signal S1 indicating the component of the leading-edge portion of the reflection-light pulse Ir tends to saturate easily when the distance to the target object 50 decreases since the detection signal value increases due to both an increase in illuminance and an increase in the amount of light caused by a phase shift. Thus, the first and second exposure periods may be set such that S1<S2. In this case, the component of the trailing-edge portion of the reflection-light pulse Ir is canceled out due to an illuminance change and a phase change having opposite characteristics, so that the signal S2 is unlikely to change relative to a change in distance. Therefore, as compared with the signal S1, the signal S2 has a high possibility of being maintained within the dynamic range even when the distance changes, and thus has a low risk of saturation.

FIG. 3B illustrates an example of another driving method of the distance-measuring device 100. The distance-measuring device 100 in this example drives the shutter once per reflection-light pulse Ir. Therefore, a circuit specialized for increasing the steepness of the leading-edge portion and the trailing-edge portion of the reflection-light pulse Ir can be designed, so that the accuracy of the distance measurement can be further enhanced. The distance-measuring device 100 may include two light sources 110 corresponding to the first and second exposure periods, respectively.

Figure 3C:
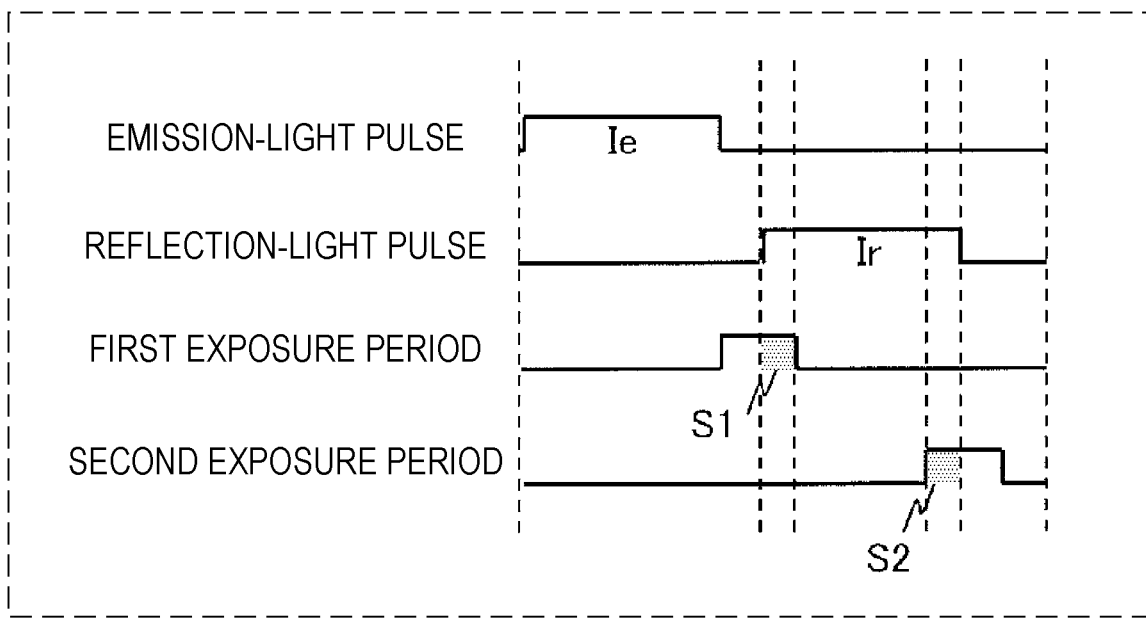
FIG. 3C illustrates yet another example of the emission-light pulse, the reflection-light pulse, and the shutter timing.

FIG. 3C illustrates another example of the emission-light pulse, the reflection-light pulse, and the shutter timing. In this example, each of the first and second exposure periods is shorter than the pulse width of the reflection-light pulse Ir. By shortening each of the first and second exposure periods in this manner, dark-current noise and fixed-pattern noise can be reduced.

Figure 3D:
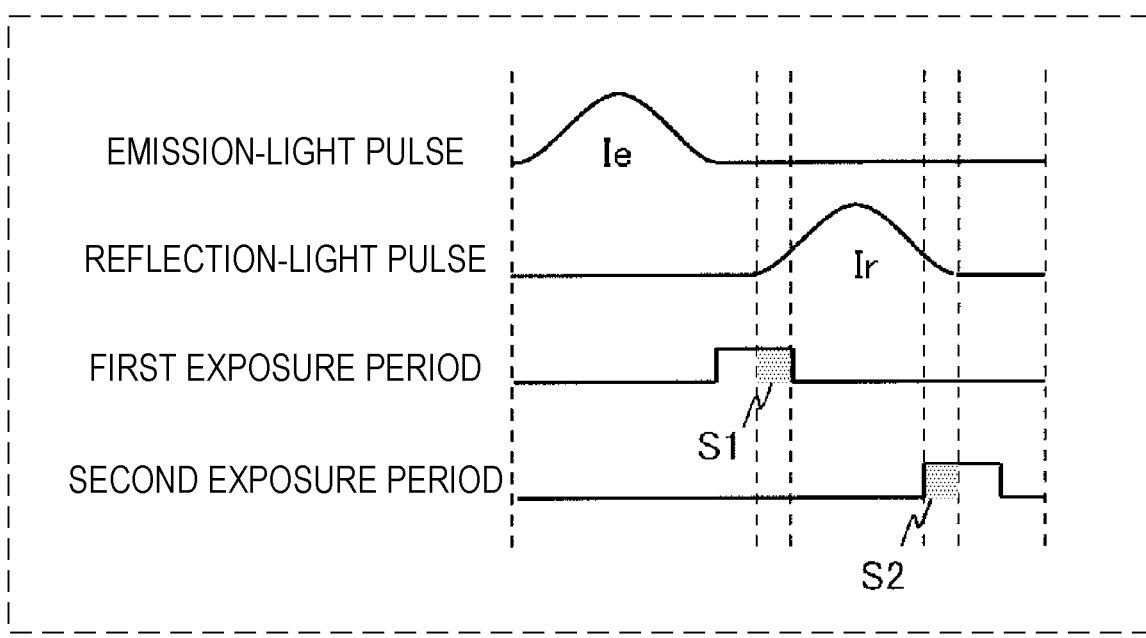
FIG. 3D illustrates yet another example of the emission-light pulse, the reflection-light pulse, and the shutter timing.

FIG. 3D illustrates yet another example of the emission-light pulse, the reflection-light pulse, and the shutter timing. The light source 110 in this example outputs an emission-light pulse Ie having a peak. The first exposure period begins prior to the start of the rise period of the reflection-light pulse Ir, and ends at an intermediate time point of the rise period. The second exposure period begins at an intermediate time point of the fall period of the reflection-light pulse Ir, and ends after the end of the fall period. Specifically, the first exposure period ends at the gradient of the leading edge of the reflection-light pulse Ir, and the second exposure period begins at the gradient of the trailing edge of the reflection-light pulse Ir. In other words, the first exposure period ends prior to the second time point, and the second exposure period begins later than the third time point. Performing such control increases the sensitivity to a change in the amount of light detected with respect to a phase change of the reflection-light pulse Ir occurring with a change in the distance to the target object 50, thereby achieving higher distance detection sensitivity. The rate of change in the amount of light increases with increasing gradient. Such control is effective especially in a case where a noise component is dominantly caused by shot noise or a change in illuminance instead of a phase change. This is because shot noise and a change in illuminance are uncorrelated with a deviation of the shutter timing. In the example illustrated in FIG. 3D, the control circuit 132 similarly adjusts the first and second shutter exposure periods such that the detected signal includes components of both edges of the reflection-light pulse Ir and does not include a component of a peak portion. Accordingly, the distance resolution can be enhanced. In this example, changes in the intensity at the leading edge and the trailing edge of the reflection-light pulse Ir do not need to be steep, as compared with the example in FIG. 3A. Thus, the light source 110 used may be a light source, such as an LED, in which a pulse does not rise and fall steeply. For example, the use of an LED as the light source 110 is advantageous in terms of higher emission intensity, higher safety, and lower cost. Although the emission-light pulse Ie and the reflection-light pulse Ir have waveforms that resemble a triangular wave in the example in FIG. 3D, these waveforms may have other shapes. For example, the emission-light pulse Ie and the reflection-light pulse Ir may have waveforms that resemble a trapezoidal wave.

In each of the examples in FIGS. 3A to 3D, the first exposure period includes a time point immediately after the rise of the reflection-light pulse Ir, and the second exposure period includes a time point at the end of the fall of the reflection-light pulse Ir. With each of the exposure periods being controlled in this manner, changes in the amount of light of S1 and S2 relative to a change in the distance to the target object 50 can be largely maintained. For example, it is assumed that the distance from the distance-measuring device 100 to the target object 50 has decreased from a reference distance. In this case, since the reflection-light pulse Ir reaches the image sensor 120 early, the waveform of the reflection-light pulse Ir illustrated in FIGS. 3A to 3D shifts leftward. Assuming that the first exposure period does not include the rise start time point of the reflection-light pulse Ir from the reference distance and is set after the start of the rise, a change in the amount of light of S1 does not occur or decreases. This results in lower distance resolution. The same applies to the fall period. Therefore, in this embodiment, the first exposure period includes the start time point for the rise period of the reflection-light pulse Ir from the reference distance, and the second exposure period includes the end time point for the fall period of the reflection-light pulse Ir. This increases the sensitivity to a change in the detection signal value relative to a change in the distance to the target object 50, thereby achieving enhanced distance resolution.

3. Operation of Electronic Circuit 130

Figure 4A:
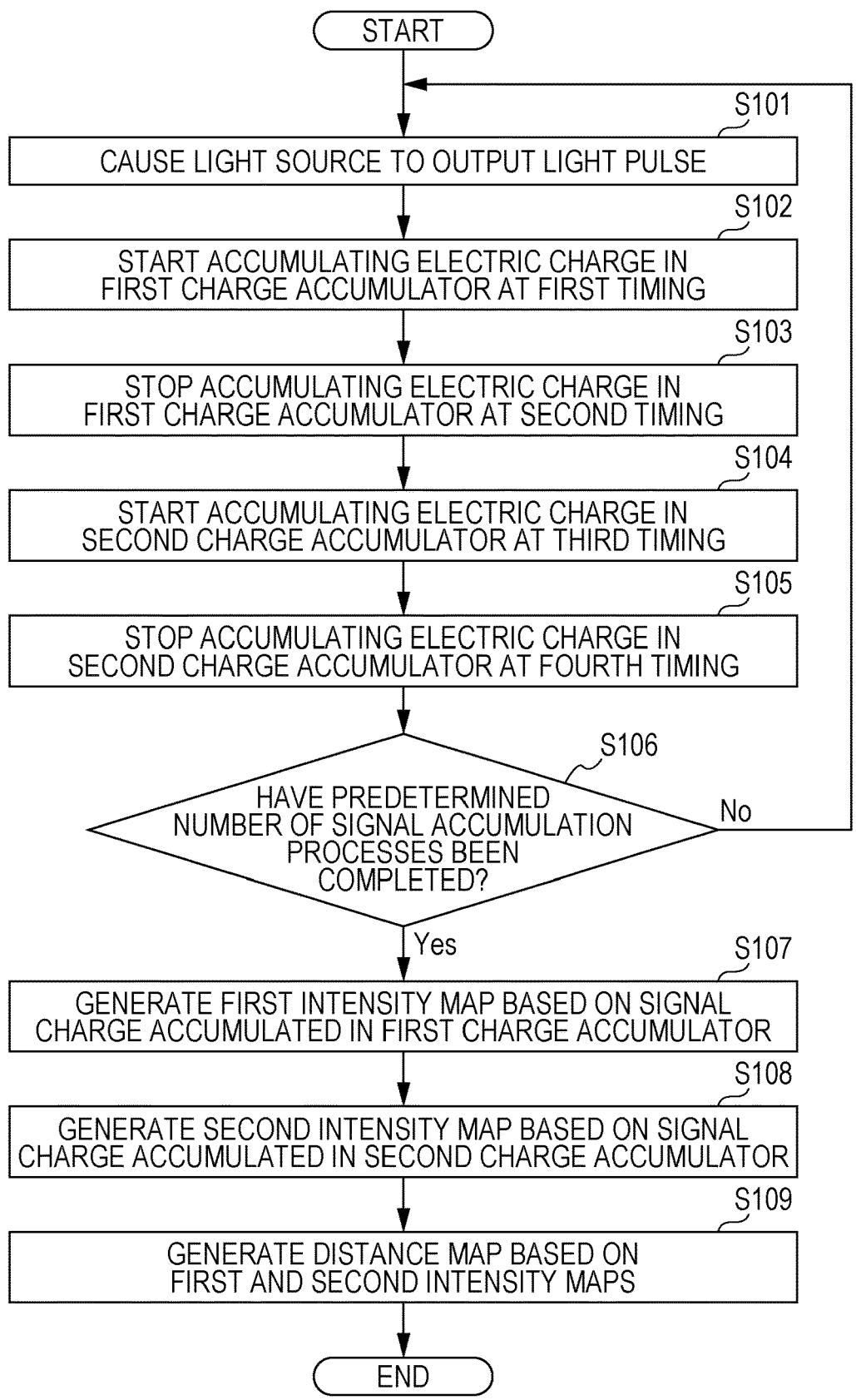
FIG. 4A is a flowchart illustrating an example of the operation of an electronic circuit.

FIG. 4A is a flowchart illustrating an example of the operation of the electronic circuit 130 according to this embodiment. This flowchart corresponds to the operation illustrated in FIG. 3A. In this example, the pixels of the image sensor 120 each include a first charge accumulator and a second charge accumulator. In step S101, the control circuit 132 in the electronic circuit 130 causes the light source 110 to output a light pulse. The time length of this light pulse is the pulse width T0. After the light pulse is output, the control circuit 132 causes the electronic shutter to start accumulating electric charge in the first charge accumulator of each pixel at a first timing in step S102. Assuming that the target object 50 is located at a preset reference distance from the distance-measuring device 100, the first timing is prior to the rise start time point of the reflection-light pulse Ir returning from the target object 50. Then, in step S103, the control circuit 132 causes the electronic shutter to stop accumulating the electric charge in the first charge accumulator of each pixel at a second timing. The second timing is later than the aforementioned rise start time point of the reflection-light pulse Ir. As a result of the process from step S101 to step S103, a component of the reflection-light pulse reaching each pixel of the image sensor 120 in the period between the first timing and the second timing is detected. Subsequently, in step S104, the control circuit 132 causes the electronic shutter to start accumulating electric charge in the second charge accumulator of each pixel at a third timing. The third timing is prior to the aforementioned fall start time point of the reflection-light pulse Ir. Then, in step S105, the control circuit 132 causes the electronic shutter to stop accumulating the electric charge in the second charge accumulator of each pixel at a fourth timing. The fourth timing is later than the aforementioned fall end time point of the reflection-light pulse Ir. As a result of the process from step S103 to step S105, a component of the reflection-light pulse reaching each pixel of the image sensor 120 in the period between the third timing and the fourth timing is detected. Subsequently, in step S106, the control circuit 132 determines whether or not the signal accumulation into each of the charge accumulators has been executed a predetermined number of times. If the determination result indicates "No", the process from step S101 to step S105 is repeated until the determination result indicates "Yes". This is repeated if the amount of light is insufficient with a single signal accumulation process. The number of repetitions is set to an appropriate value in accordance with a required signal-to-noise (S/N) ratio.

When the determination result indicates "Yes" in step S106, the control circuit 132 causes the signal processing circuit 134 to generate a first intensity map based on the signal charge accumulated in the first charge accumulator of each pixel in step S107. Furthermore, in step S108, the control circuit 132 causes the signal processing circuit 134 to generate a second intensity map based on the signal charge accumulated in the second charge accumulator of each pixel. Each of the first intensity map and the second intensity map is image data having different pixel values in accordance with the time of flight of the reflection-light pulse. Subsequently, in step S109, the signal processing circuit 134 executes the calculation indicated in Expression 1 above based on the data of the first and second intensity maps, so as to determine the distance of each pixel, thereby generating a distance map. The distance map is image data in which each pixel has a distance value. The signal processing circuit 134 stores the generated distance map in a storage medium, such as a memory.

In step S109, the signal processing circuit 134 may determine the distance of each pixel by referring to a table stored in advance in a storage medium, such as the memory 136, instead of determining the distance of each pixel based on the calculation indicated in Expression 1. Such a table defines, for example, the relationship between the range of a value S2/(S1+S2) and the distance corresponding to the range. Alternatively, the table may define the relationship between the range of a value S1/(S1+S2) and the distance corresponding to the range.

As a result of the process from step S101 to step S109, a distance map for one frame is generated. The electronic circuit 130 may repeat the process from step S101 to step S109 to generate a distance map for frames. As a result of the above process, a distance map, that is, a distance image, of the target object 50 can be generated with high accuracy.

FIG. 4B is a flowchart illustrating another example of the operation of the electronic circuit 130 according to this embodiment. This flowchart corresponds to the operation illustrated in FIG. 3B. This example is different from the example in FIG. 4A in that the charge accumulation into the first charge accumulator and the charge accumulation into the second charge accumulator are performed based on different emission-light pulses. A process from step S201 to step S203 are identical to the process from step S101 to step S103 in FIG. 4A. After step S203, the control circuit 132 causes the light source 110 to output another light pulse in step S204. Then, from step S205 to step S207, a process similar to the process from step S104 to step S106 in FIG. 4A is executed. When it is determined in step S207 that a predetermined number of signal accumulation processes has been completed on the first charge accumulator and the second charge accumulator, the control circuit 132 causes the signal processing circuit 134 to execute a process from step S208 to step S210. The process from step S208 to step S210 is identical to the process from step S107 to step S109 in FIG. 4A.

As a result of the process from step S201 to step S210, a distance map for one frame is generated. The electronic circuit 130 may repeat the process from step S201 to step S210 to generate a distance map for frames. As a result of the above process, a distance map of the target object 50 can be generated with high accuracy.

The light emission and the charge accumulation do not have to be performed multiple times and are performed as appropriate. Furthermore, instead of allocating the two types of signal charge accumulation processes for generating the first and second intensity maps to the two charge accumulators, the two types of signal charge accumulation processes may be allocated to two different frames. For example, the shutter timing may be varied for each frame, such that the first intensity map may be generated with odd-numbered frames and the second intensity map may be generated with even-numbered frames. Moreover, the shutter timing may be varied for each pixel. Accordingly, the first intensity map and the second intensity map can each be acquired by being allocated to each pixel. For example, the first intensity map may be acquired in a checkered pattern on the pixels, and the second intensity map may be acquired similarly in a checkered pattern on the remaining pixels. The first intensity map and the second intensity map can each be acquired by being allocated to each pixel row. For example, the first intensity map may be acquired with odd-numbered pixel rows, and the second intensity map may be acquired with even-numbered pixel rows. After spatial interpolation is performed on the decimated pixels in each of the first and second intensity maps, a distance map may be generated in accordance with a calculation based on the first and second intensity maps.

Figure 4C:
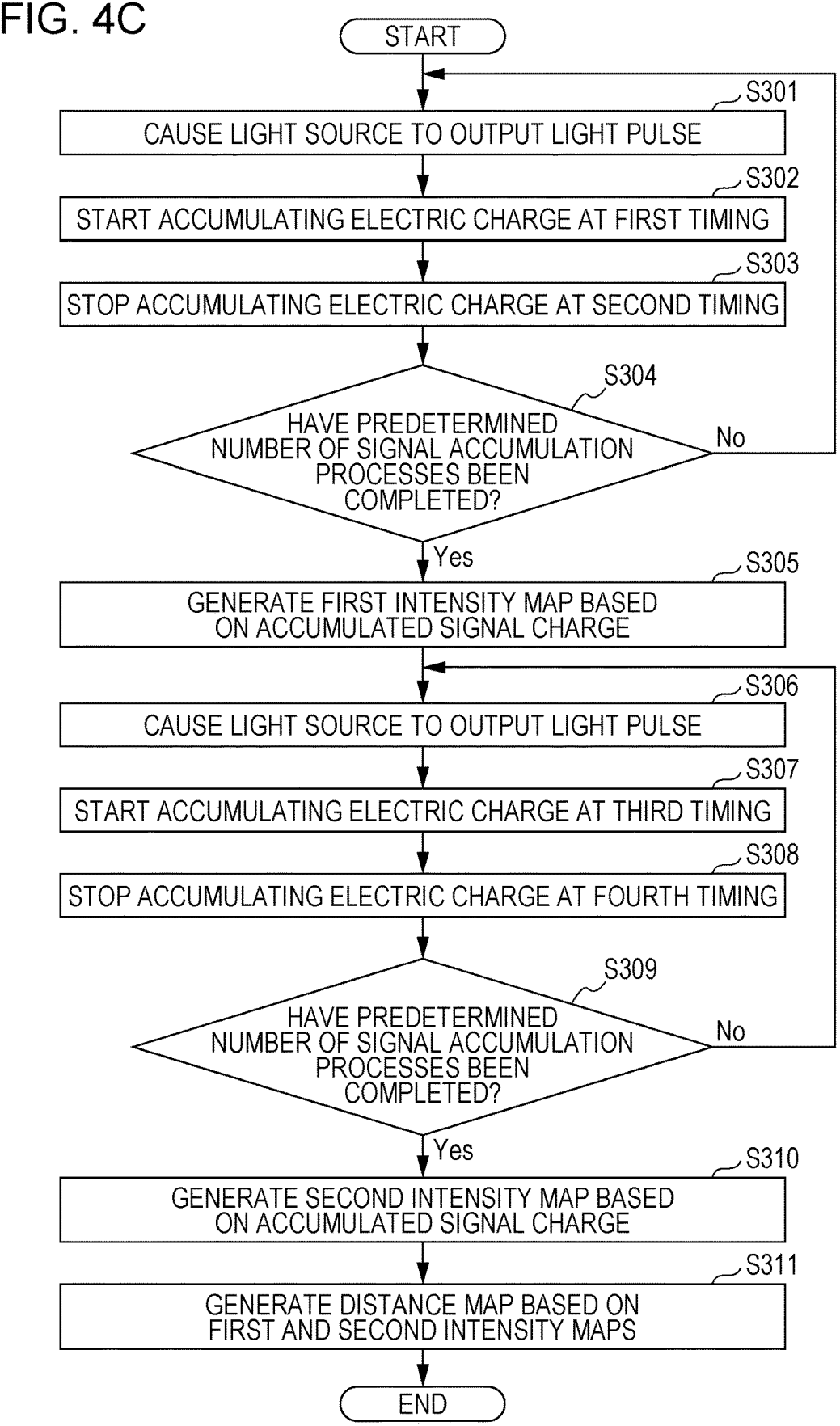
FIG. 4C is a flowchart illustrating yet another example of the operation of the electronic circuit.

FIG. 4C is a flowchart illustrating an example of a process for generating an intensity map that varies from frame to frame. In this example, the control circuit 132 first causes the light source 110 to output a light pulse for a predetermined time period in step S301. In step S302, the control circuit 132 causes the electronic shutter to start accumulating electric charge in each charge accumulator at a first timing. Then, in step S303, the control circuit 132 causes the electronic shutter to stop accumulating the electric charge in the charge accumulator at a second timing. As a result of this process, the signal charge corresponding to a component of the leading-edge portion of the reflection-light pulse is accumulated in the charge accumulator. In step S304, the control circuit 132 determines whether or not the signal accumulation has been executed a predetermined number of times. If the determination result indicates "No", the process from step S301 to step S303 is repeated until the determination result indicates "Yes". When the determination result indicates "Yes" in step S304, the control circuit 132 causes the signal processing circuit 134 to generate a first intensity map based on the signal charge accumulated in the charge accumulator, and resets the signal charge in the charge accumulator in step S305. Then, in step S306, the control circuit 132 causes the light source 110 to output a light pulse for a predetermined time period. In step S307, the control circuit 132 causes the electronic shutter to start accumulating electric charge in the charge accumulator at a third timing. Subsequently, in step S308, the control circuit 132 causes the electronic shutter to stop accumulating the electric charge in the charge accumulator at a fourth timing. As a result of this process, the signal charge corresponding to a component of the trailing-edge portion of the reflection-light pulse is accumulated in the charge accumulator. Then, in step S309, the control circuit 132 determines whether or not the signal accumulation has been executed a predetermined number of times. If the determination result indicates "No", the process from step S306 to step S308 is repeated until the determination result indicates "Yes". When the determination result indicates "Yes" in step S309, the control circuit 132 causes the signal processing circuit 134 to generate a second intensity map based on the signal charge accumulated in the charge accumulator, and resets the signal charge in the charge accumulator in step S310. Then, in step S311, the signal processing circuit 134 generates a distance map from the data of the first and second intensity maps in accordance with the above-described method.

As a result of the process from step S301 to step S311, a distance map of the target object 50 can be generated with high accuracy. Although the operation illustrated in FIG. 4C is for two frames, the operation illustrated in FIG. 4C may be repeated to obtain a distance map of a larger number of frames. Although a distance map is generated once for every two frames in the example in FIG. 4C, a distance map may be generated for every frame. For example, a step similar to step S311 may be added between step S305 and step S306. In that case, in the added step, a distance map can be generated based on the first intensity map obtained in step S305 and the second intensity map obtained from one previous frame.

Second Embodiment

Next, a distance-measuring device 100 according to a second embodiment will be described.

The distance-measuring device 100 according to this embodiment is different from that in the first embodiment in that the distance-measuring device 100 has a driving mode for setting the first and second exposure periods to detect the edges of the reflection-light pulse Ir. The following description focuses on the differences from the first embodiment, and redundant explanations will be omitted.

The distance-measuring device 100 drives the image sensor 120 to detect both edges of the reflection-light pulse Ir for enhancing the distance measurement accuracy. However, since the timing at which the reflection-light pulse Ir returns changes depending on the distance between the target object 50 and the distance-measuring device 100, a case where the edges of the reflection-light pulse Ir are not detectable at a preset shutter timing may occur. In particular, as T0–(t2–t1) is reduced for enhancing the distance measurement accuracy, the distance measurement range, that is, a distance range in which distance measurement is possible, becomes smaller, thus causing either of the first and second exposure periods to deviate readily outside the reflection-light pulse Ir.

In this embodiment, as illustrated in FIG. 5, the operation is executed in a wide range mode, which is a distance measurement mode with a wide distance measurement range, before being executed in a high-accuracy distance measurement mode in which only the components of both edges of the reflection-light pulse Ir are detected. The electronic circuit 130 calculates an approximate distance in accordance with the wide range mode, and reflects the result on a shutter-phase adjustment in the high-accuracy distance measurement mode. For example, as illustrated in FIG. 5, in the wide range mode, the image sensor 120 is driven such that either of the first and second exposure periods includes a midpoint of the reflection-light pulse Ir. The midpoint of the reflection-light pulse Ir refers to a center time point between the rise start time point and the fall end time point of the reflection-light pulse Ir. In the wide range mode, the end time point of the first exposure period coincides with the start time point of the second exposure period. In the wide range mode, the distance measurement range is dependent on the pulse width T0. For example, if the pulse width T0 is 5 ns, a distance measurement range of about 75 cm can be ensured. In order to further expand the distance measurement range, the pulse width T0 may be increased only in the wide range mode. In the wide range mode, the distance z is calculated using Expression 3.

$$z = c \frac{T_0}{2} \times \frac{S_2}{S_1 + S_2}$$

FIG. 6 is a flowchart schematically illustrating a process for adjusting the shutter timing within the distance measurement range. First, in step S401, the control circuit 132 determines whether the edges of the reflection-light pulse are detected in both of the first and second exposure periods. The determination of whether or not the edges of the reflection-light pulse are detected in each exposure period is performed based on the intensities of the signals S1 and S2. If the determination result indicates "Yes" in step S401, the process proceeds to step S404. If the determination result indicates "No" in step S401, the process proceeds to step S402. If either of or each of the signals S1 and S2 does not include a signal component other than a component resulting from environmental light, the edges are not detected, and the determination result indicates "No". If either of or each of the signals S1 and S2 has a value much larger than an assumed value, it is conceivable that a central portion of the reflection-light pulse is detected instead of the edges thereof, so that the determination result indicates "No". When the determination result indicates "No" in step S401, the control circuit 132 transitions to the wide range mode. In the wide range mode, the control circuit 132 drives the shutter at a timing at which one of the two exposure periods includes the center time point of the reflection-light pulse. In step S402, the control circuit 132 calculates the distance to the target object 50 based on Expression 3, and calculates an amount of deviation from an appropriate phase-difference value between each exposure period and the reflection-light pulse based on the distance. Furthermore, in step S403, the control circuit 132 finely adjusts a relative timing between the emission-light pulse and each exposure period from the calculated amount of phase deviation, and detects components of both edges of the reflection-light pulse Ir in the first and second exposure periods. The appropriate phase difference changes depending on the distance to the target object 50. Therefore, in order to finely adjust the relative timing, for example, a table that defines the relationship between the distance and the appropriate phase difference may be retained in advance. By referring to the table, the control circuit 132 can adjust the emission timing of the emission-light pulse relative to a reference clock or the timing of each exposure period, so as to obtain an appropriate phase difference relative to the detected distance. After step S403 or when the determination result indicates "Yes" in step S401, the signal processing circuit 134 calculates the distance based on Expression 1 in step S404 from the detection signal values obtained in the first and second exposure periods.

As a result of the above-described process, if the edges of the reflection-light pulse Ir are not detectable at a preset shutter timing, the shutter timing can be adjusted so that the edges of the reflection-light pulse Ir become detectable. Accordingly, even in a case where the distance between the target object 50 and the distance-measuring device 100 changes over time, distance information can still be acquired stably with high accuracy.

Third Embodiment

A third embodiment relates to an application using the distance-measuring device 100.

Figure 7:
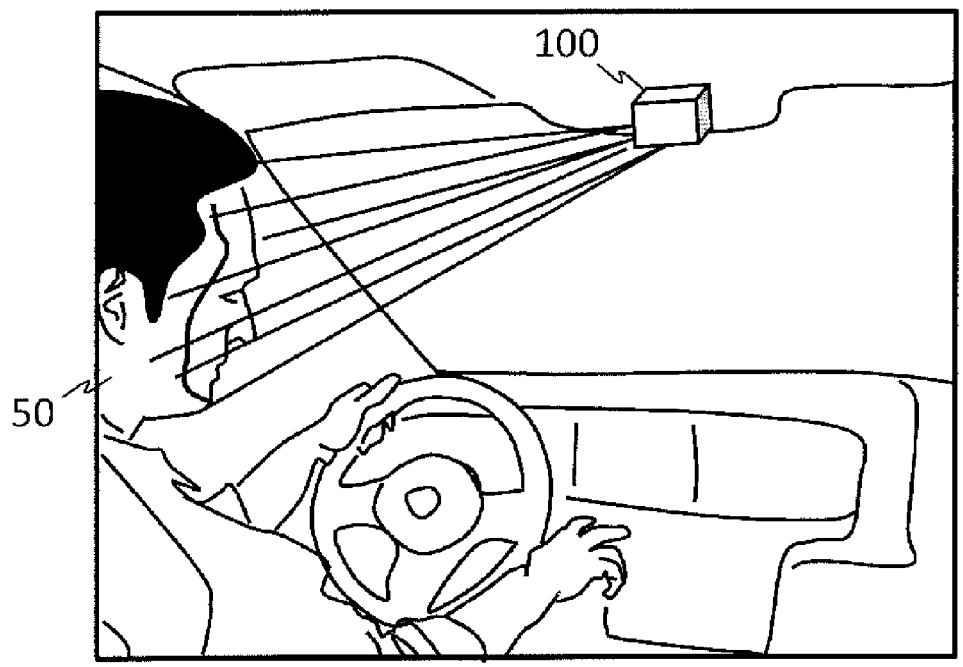
FIG. 7 illustrates an example where the distance-measuring device is used for driver authentication.

FIG. 7 schematically illustrates an example where the distance-measuring device 100 according to the first or second embodiment is installed inside a vehicle cabin of a vehicle. In the example illustrated in FIG. 7, the distance-measuring device 100 is provided inside the vehicle cabin of the vehicle. The distance-measuring device 100 can acquire a 3D texture of a driver serving as the target object 50 that is to undergo a distance-measuring process. By checking the data of the acquired 3D texture against a database, it is possible to identify whether the driver is the owner of the vehicle. The driver may be identified by the distance-measuring device 100, and the vehicle may be started without using the key of the vehicle. During an automated driving mode, the distance-measuring device 100 may identify an occupant, feedback the identification result to an automated-driving control system, and perform customized driving for the occupant. The customized driving may include, for example, performing braking softly if the occupant is an aged person or has a back pain, or performing exhilarating driving if the occupant is a driving enthusiast. By performing such feedback, automated driving suited for the taste of each individual is possible.

Figure 8A:
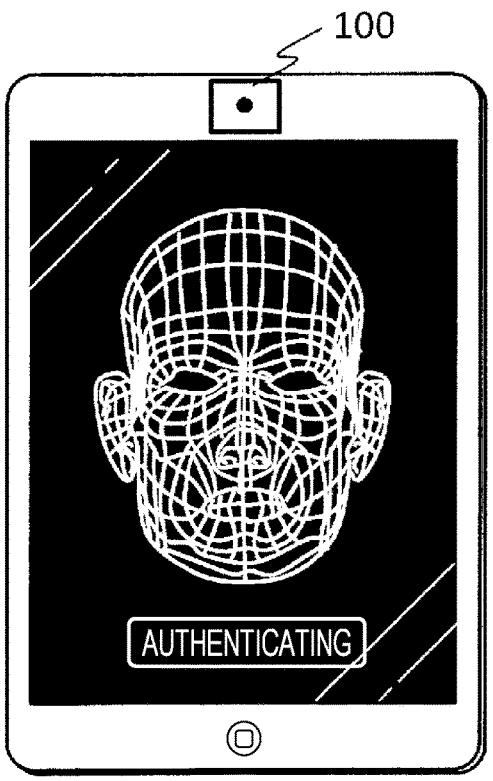
FIG. 8A illustrates an example where a mobile terminal equipped with the distance-measuring device is performing personal authentication.
Figure 8B:
FIG. 8B illustrates another example where the mobile terminal equipped with the distance-measuring device is performing personal authentication.

FIGS. 8A and 8B schematically illustrate an example where the distance-measuring device 100 according to the first or second embodiment is applied to a mobile terminal. The mobile terminal is, for example, a smartphone, a tablet, or a personal computer. The image sensor 120 used in the distance-measuring device 100 may be an image sensor contained in the mobile terminal. Personal authentication is possible from 3D data of the user's face obtained from the distance-measuring device 100. FIG. 8A illustrates an example of a screen of the mobile terminal during authentication. FIG. 8B illustrates an example of a screen of the mobile terminal when the authentication is successful. The mechanism of such authentication is effective not only for logging into the mobile terminal but also for logging into an online account. In this embodiment, the 3D data of the user's face is used so that the amount of information increases, thereby achieving enhanced identification accuracy, as compared with a two-dimensional image used in the related art. Accordingly, fake authentication involving, for example, reading a user's photograph in front of a camera can be eliminated, thereby realizing highly-secure authentication. Moreover, in this embodiment, high-definition 3D facial data can be created in accordance with the high-accuracy distance measurement performed by detecting components of both edges of the reflection-light pulse Ir, so that the authentication accuracy can be further enhanced, as compared with the 3D authentication in the related art. Therefore, the technique according to this embodiment is appropriate in an application where extremely high authentication accuracy is required, such as in an electronic payment using a mobile terminal. For example, the technique according to the present disclosure may be used as one of methods of multi-step authentication during a high-value payment, and may become a key technology in a cashless society.

In addition to being used in a vehicle or a mobile terminal, the distance-measuring device 100 may also be used for, for example, identifying an account holder at an automatic teller machine (ATM) set in a bank or a convenience store, unlocking the entrance of a residential home, or managing the entry and exit to and from an office.

In addition to performing distance measurement, the distance-measuring device 100 can also acquire internal information under the skin of the target object 50. An example of such a distance-measuring device 100 will be described below. In the following description, the internal information under the skin of the target object 50 will be referred to as "biological information".

FIG. 9 illustrates the operation of the distance-measuring device 100 that acquires biological information about the target object 50 in addition to distance information. In this example, a third exposure period for acquiring the biological information is provided in addition to the first exposure period and the second exposure period for the distance measurement. Each pixel of the image sensor 120 has three or more charge accumulators. In the first exposure period, the signal S1 indicating the component of the leading-edge portion of the reflection-light pulse Ir is acquired. In the second exposure period, the signal S2 indicating the component of the trailing-edge portion of the reflection-light pulse Ir is acquired. The third exposure period begins at a later timing than the second exposure period relative to the start time point of the emission-light pulse. Accordingly, in the third exposure period, a signal S3 indicating a component in a fall period serving as a period from when the intensity of the reflection-light pulse Ir starts decreasing to when the intensity stops decreasing is acquired. With the third exposure period provided, for example, a light component that is scattered under the skin and that has a relatively large optical path length can be detected. Accordingly, for example, a blood-vessel distribution centered on veins can be clearly detected.

Figure 10:
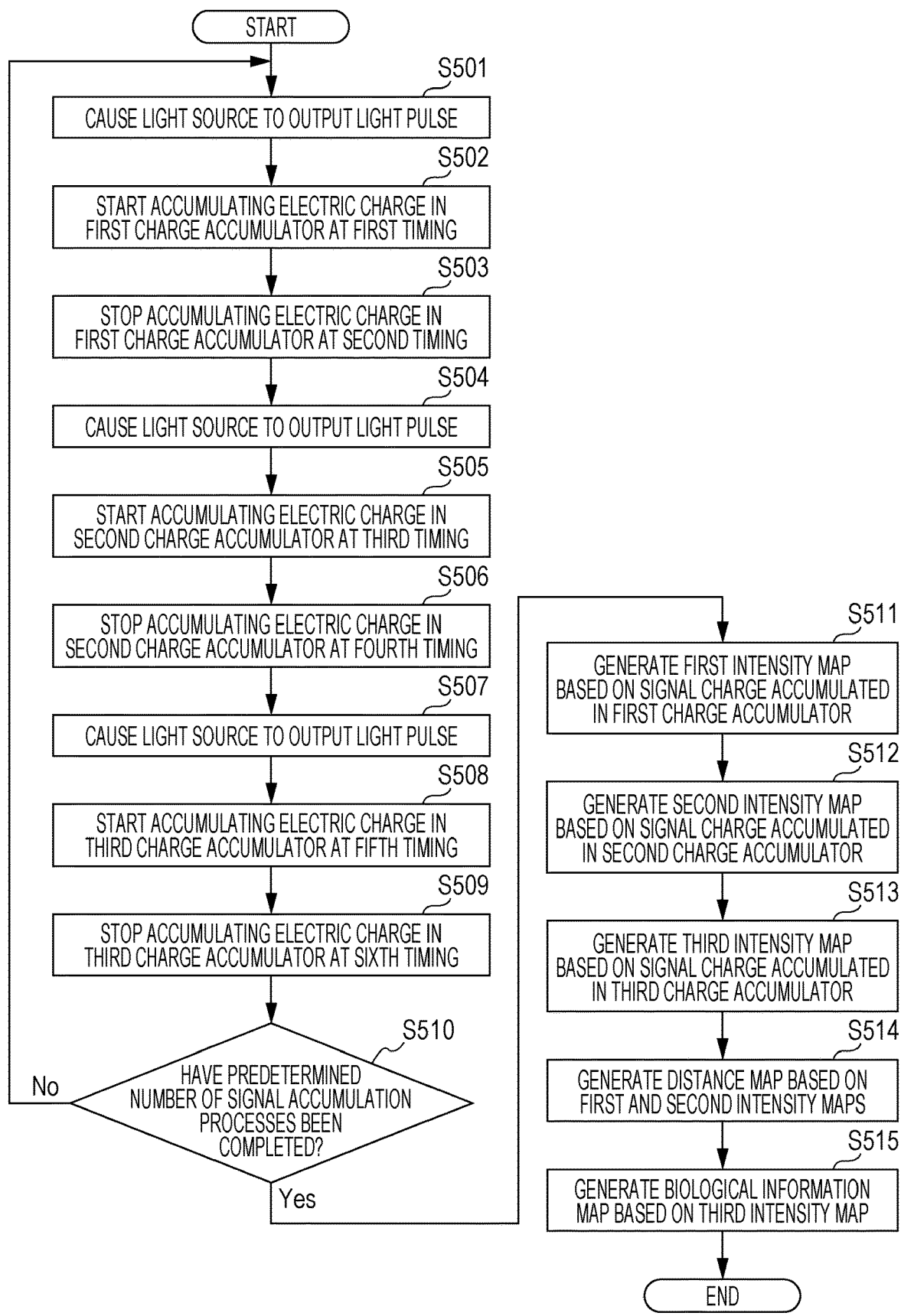
FIG. 10 is a flowchart illustrating an example of the operation of the electronic circuit in the example illustrated in FIG. 9.

FIG. 10 is a flowchart illustrating the operation of the electronic circuit 130 in the example illustrated in FIG. 9. In this flowchart, a process from step S501 to step S506 is the same as the process from step S201 to step S206 illustrated in FIG. 4B. In this embodiment, after step S506, the control circuit 132 causes the light source 110 to output a light pulse in step S507. Then, in step S508, the control circuit 132 causes the image sensor 120 to start accumulating electric charge in a third charge accumulator at a fifth timing. Subsequently, in step S509, the control circuit 132 causes the image sensor 120 to stop accumulating the electric charge in the third charge accumulator at a sixth timing. The process from step S501 to step S509 is repeated until it is determined in step S510 that a predetermined number of signal accumulation processes have been completed in each charge accumulator. When it is determined in step S510 that the predetermined number of signal accumulation processes have been completed, the control circuit 132 causes the signal processing circuit 134 to generate first to third intensity maps in step S511 to step S513 based on the signal charge accumulated in the first to third charge accumulators. Then, similar to the above embodiments, in step S514, the signal processing circuit 134 generates a distance map based on the first and second intensity maps. Moreover, in step S515, the signal processing circuit 134 generates a biological information map based on the third intensity map. The biological information map is image data generated as a result of processing based on the signal S3 of each pixel. The biological information map may be image data indicating, for example, a blood-vessel distribution.

The blood-vessel distribution obtained as a result of the aforementioned processing and 3D-texture information based on the distance map may be combined with each other, so that each individual can be identified with high accuracy to an extent that, for example, identical twins can be distinguished from each other. Furthermore, the blood-vessel distribution may be converted into a three-dimensional image based on the distance information and may be displayed.

Figure 11A:
FIG. 11A illustrates an example where personal authentication is performed by using distance measurement information and biological information.
Figure 11B:
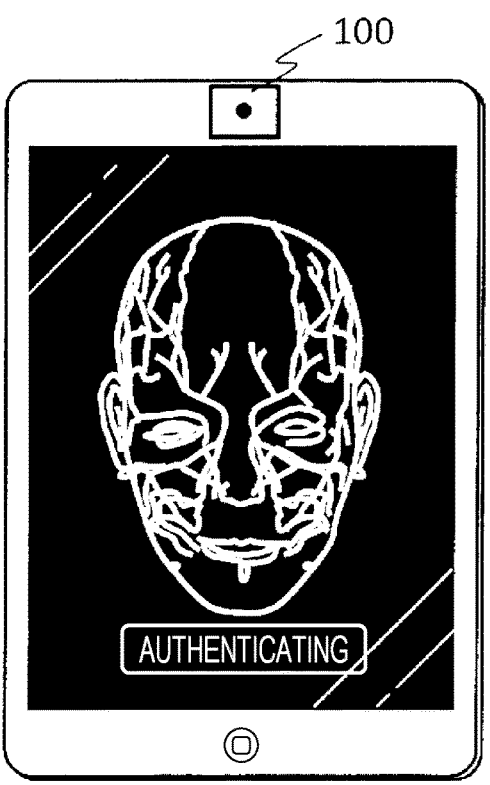
FIG. 11B also illustrates the example where the personal authentication is performed by using the distance measurement information and the biological information.

FIGS. 11A and 11B each illustrate an example of a three-dimensionally-displayed blood-vessel-distribution image. A facial image captured from a direction other than from the front, as illustrated in FIG. 11A, can be converted into a blood-vessel-distribution image viewed from the front, as illustrated in FIG. 11B, by undergoing projective transformation using three-dimensional information. By performing such conversion, the stability of a comparison between a photographically-acquired blood-vessel distribution and a standard database preliminarily stored in a storage medium can be enhanced. As a result, a false rejection rate or a false acceptance rate can be reduced. Furthermore, even when a user photographs oneself unintentionally from an angle different from that in the database, the terminal can automatically correct the image and recognize the user, so that the speed of recognition can be increased.

As an alternative to the example in FIG. 9 in which three types of exposure periods are provided, the information about blood vessels under the skin may be acquired in the second exposure period instead of the third exposure period. By using near-infrared light ranging from about 650 nm to 1000 nm that can readily penetrate under the skin, a considerable amount of blood-vessel information can be acquired regardless of the shutter timing. By acquiring internal-blood-vessel information in the second exposure period, the types of shutters can be reduced to two types, and the frame rate can be improved. The blood-vessel-distribution database preliminarily stored in the storage medium may be two-dimensional data or three-dimensional data. Alternatively, a database having a combination of two-dimensional blood-vessel data and 3D-facial-texture data may be used.

Practical Example

Figure 12:
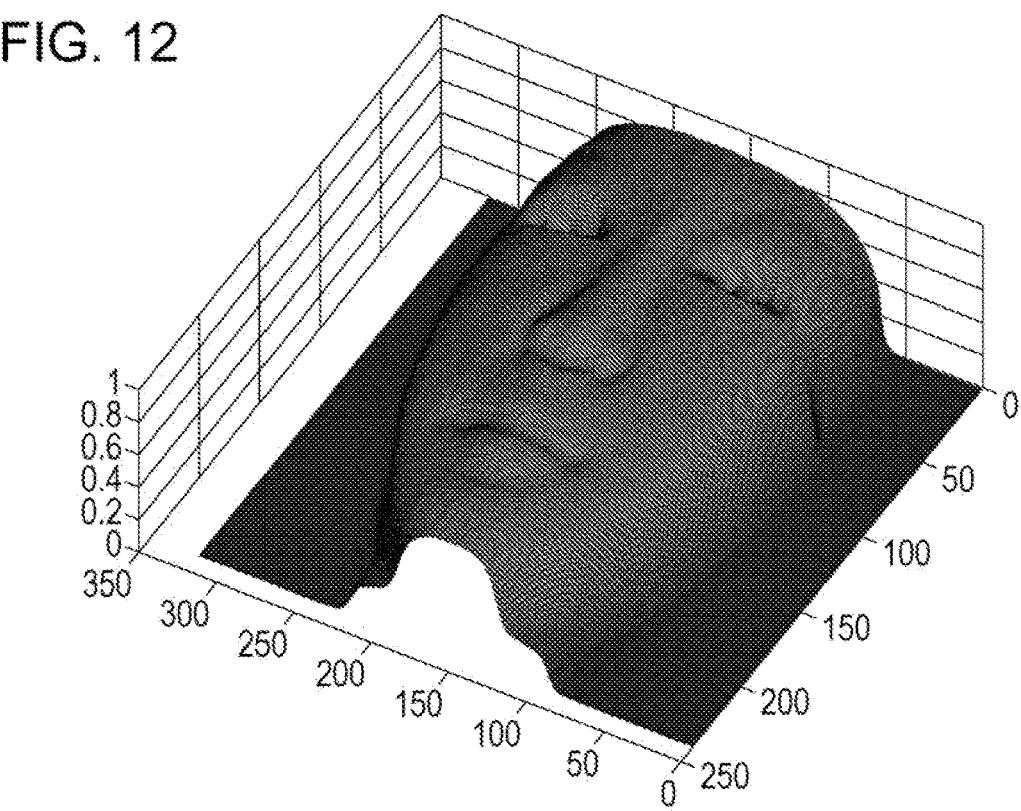
FIG. 12 illustrates a result obtained by performing distance measurement on the face in accordance with a practical example.

FIG. 12 illustrates an actual measurement result obtained by performing distance measurement on the face of a mannequin with the same size as a human by using the distance-measuring device 100. The distance between the distance-measuring device 100 and the mannequin's face is set to 30 cm. The distance-measuring device 100 is provided with an F2.5 lens with a horizontal field angle of ±16.3°, and the number of pixels in the image sensor 120 is set to 320×240 pixels. The pulse width T0 of the light source 110, that is, the time period from the rise start time point to the rise end time point of the emission-light pulse, is set to 5 ns. Components in periods extending one-tenth from the reference distance to the opposite edges of the reflection-light pulse Ir, namely, a period from the rise start time point of the reflection-light pulse Ir to a 0.5-ns time point and a period from a 0.5-ns time point prior to the rise end time point to the rise end time point, are detected. In this case, the distance measurement range is ±7.5 cm. Although this distance measurement range is normally not a problem for detecting a 3D facial image, since the size of the face varies from individual to individual, the shutter timing may be set such that the reflection-light pulse Ir is detected further inward by about 1 ns to be on the safe side.

Figure 13:
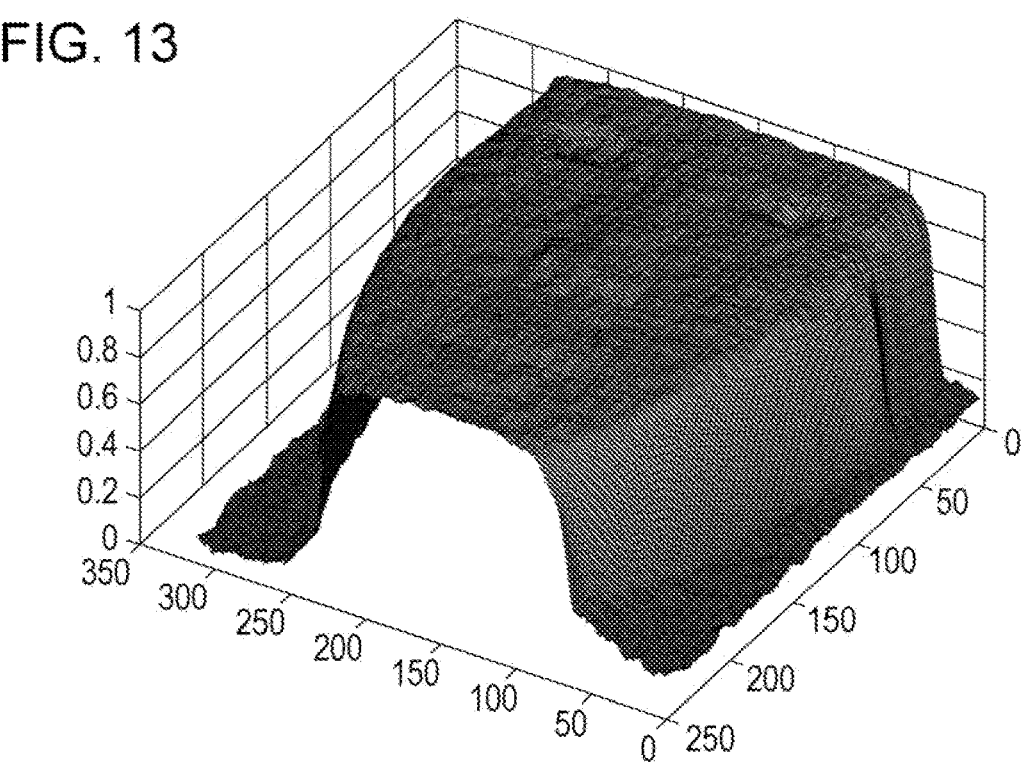
FIG. 13 illustrates a result obtained by performing distance measurement on the face in accordance with a comparative example.

On the other hand, FIG. 13 illustrates a result obtained in a comparative example in which the same mannequin is measured using a distance-measuring method in the related art. In this comparative example, the distance z is calculated based on Expression 4 indicated below in place of Expression 1:

$$z = c \frac{T_0}{2} \times \frac{S_2}{S_1}$$

Unlike the practical example, the signal S1 is acquired by adjusting the shutter timing for exposure such that the entire reflection-light pulse Ir is detected. The signal S2 is acquired using the same method as in the practical example.

In a facial image illustrated in FIG. 13 acquired using the distance-measuring method in the related art, the protrusions and recesses of the organs of the face are not distinguishable. In contrast, with the distance-measuring method according to the practical example, the surface profile and depth distribution of the face can be acquired in detail, as illustrated in FIG. 12, so that the effectiveness of the technique according to the present disclosure is confirmed. A distance measurement variation is 0.12 mm based on a calculation using 3σ. The technique according to the present disclosure demonstrates that high distance-measurement accuracy can be realized.

The distance-measuring device according to the present disclosure can acquire information about the distance to a target object or about the surface profile thereof in a non-contact fashion with high accuracy. Thus, the distance-measuring device according to the present disclosure is useful in a wide range of fields, such as object recognition, line inspection, and authentication.

What is claimed is:

1. A distance-measuring device comprising:
a light source;
a light detector; and
an electronic circuit that controls the light source and the light detector,
wherein the electronic circuit causes the light source to output a light pulse toward a target object,
wherein the electronic circuit causes the light detector to generate a first signal by causing the light detector to detect a reflection-light pulse in a first period including at least a part of a rise period and a first time point, the rise period extending from the first time point at which an intensity of the reflection-light pulse occurring from the target object due to the light pulse starts increasing to a second time point at which the increasing ends,
wherein the electronic circuit causes the light detector to generate a second signal by causing the light detector to detect the reflection-light pulse in a second period after the first period ends, the second period including at least a part of a fall period and a fourth time point, the fall period extending from a third time point at which the intensity of the reflection-light pulse starts decreasing to the fourth time point at which the decreasing ends,
wherein the electronic circuit generates data indicating a distance from the light detector to the target object based on the first signal and the second signal and outputs the data data,
wherein the first period ends prior to a midpoint between the first time point and the fourth time point, and
wherein the second period begins later than the midpoint.

2. The distance-measuring device according to claim 1, wherein the light pulse has a pulse width that is greater than or equal to 3 ns and less than or equal to 30 ns.

3. The distance-measuring device according to claim 1, wherein T0/3<(t2−t1)<T0 is satisfied, where t1 denotes a time period from when the output of the light pulse starts to when the first period ends, t2 denotes a time period from when the output of the light pulse starts to when the second period begins, and T0 denotes a pulse width of the light pulse.

4. The distance-measuring device according to claim 1, wherein the first period ends prior to the second time point, and
wherein the second period begins later than the third time point.

5. The distance-measuring device according to claim 1, wherein a timing at which the first period begins is different from a timing at which the output of the light pulse starts, or
wherein a timing at which the second period begins is different from a timing at which the output of the light pulse ends.

6. A distance-measuring device comprising:
a light source;
a light detector; and
an electronic circuit that controls the light source and the light detector,
wherein the electronic circuit causes the light source to output a first light pulse and a second light pulse toward a target object,
wherein the electronic circuit causes the light detector to generate a first signal by causing the light detector to detect a first reflection-light pulse in a first period including at least a part of a rise period and a first time point, the rise period extending from the first time point at which an intensity of the first reflection-light pulse occurring from the target object due to the first light pulse starts increasing to a second time point at which the increasing ends,
wherein the electronic circuit causes the light detector to generate a second signal by causing the light detector to detect a second reflection-light pulse in a second period including at least a part of a first fall period and a fourth time point, the first fall period extending from a third time point at which an intensity of the second reflection-light pulse occurring from the target object due to the second light pulse starts decreasing to the fourth time point at which the decreasing ends,
wherein the electronic circuit generates data indicating a distance from the light detector to the target object based on the first signal and the second signal and outputs the data data,
wherein the first period ends prior to a midpoint between the first time point and a time point at which a decrease in the intensity of the first reflection-light pulse ends, and
wherein the second period begins later than a midpoint between a time point at which the intensity of the second reflection-light pulse starts increasing and the fourth time point.

7. The distance-measuring device according to claim 6, wherein each of the first light pulse and the second light pulse has a pulse width that is greater than or equal to 3 ns and less than or equal to 30 ns.

8. The distance-measuring device according to claim 6, wherein $T0/3<(t2-t1)<T0$ is satisfied, where t1 denotes a time period from when the output of the first light pulse starts to when the first period ends, t2 denotes a time period from when the output of the second light pulse starts to when the second period begins, and T0 denotes a pulse width of each of the first light pulse and the second light pulse.

9. The distance-measuring device according to claim 6, wherein the first period ends prior to the second time point, and
wherein the second period begins later than the third time point.

10. The distance-measuring device according to claim 6, wherein a timing at which the first period begins is different from a timing at which the output of the first light pulse starts, or
wherein a timing at which the second period begins is different from a timing at which the output of the second light pulse ends.

11. The distance-measuring device according to claim 6, wherein the target object is a biological organism,
wherein the light source further outputs a third light pulse toward the target object,
wherein the light detector further detects a third reflection-light pulse returning from the target object and occurring due to the third light pulse,
wherein the electronic circuit causes the light detector to output a third signal by causing the light detector to detect the third reflection-light pulse in a third period including at least a part of a second fall period and a sixth time point, the second fall period extending from a fifth time point at which an intensity of the third reflection-light pulse starts decreasing to the sixth time point at which the decreasing ends,
wherein a length from a beginning of the third period to the sixth time point is smaller than a length from a beginning of the second period to the fourth time point, and
wherein the electronic circuit generates biological information of the target object based on the third signal and outputs the biological information.

12. A signal processing device comprising:
at least one processor; and
a memory that stores a computer program to be executed by the at least one processor,
wherein the at least one processor executes the computer program to perform a process including
causing a light source to output a light pulse toward a target object,
causing a light detector to generate a first signal by causing the light detector to detect a reflection-light pulse in a first period including at least a part of a rise period and a first time point, the rise period extending from the first time point at which an intensity of the reflection-light pulse occurring from the target object due to the light pulse starts increasing to a second time point at which the increasing ends,
causing the light detector to generate a second signal by causing the light detector to detect the reflection-light pulse in a second period after the first period ends, the second period including at least a part of a fall period and a fourth time point, the fall period extending from a third time point at which the intensity of the reflection-light pulse starts decreasing to the fourth time point at which the decreasing ends,
generating data indicating a distance from the light detector to the target object based on the first signal and the second signal and outputting the data,
wherein the first period ends prior to a midpoint between the first time point and the fourth time point, and
wherein the second period begins later than the midpoint.

13. A signal processing device comprising:
at least one processor; and
a memory that stores a computer program to be executed by the at least one processor,
wherein the at least one processor executes the computer program to perform a process including
causing a light source to output a first light pulse and a second light pulse toward a target object,
causing a light detector to generate a first signal by causing the light detector to detect a first reflection-light pulse in a first period including at least a part of a rise period and a first time point, the rise period extending from the first time point at which an intensity of the first reflection-light pulse occurring from the target object due to the first light pulse starts increasing to a second time point at which the increasing ends,
causing the light detector to generate a second signal by causing the light detector to detect a second reflection-light pulse in a second period including at least a part of a fall period and a fourth time point, the fall period extending from a third time point at which an intensity of the second reflection-light pulse occurring from the target object due to the second light pulse starts decreasing to the fourth time point at which the decreasing ends, and
generating data indicating a distance from the light detector to the target object based on the first signal and the second signal and outputting the data data,
wherein the first period ends prior to a midpoint between the first time point and a time point at which a decrease in the intensity of the first reflection-light pulse ends, and
wherein the second period begins later than a midpoint between a time point at which the intensity of the second reflection-light pulse starts increasing and the fourth time point.

14. A non-transitory computer-readable recording medium storing a program for executing a process comprising:
outputting a light pulse toward a target object;
causing a light detector to generate a first signal by causing the light detector to detect a reflection-light pulse in a first period including at least a part of a rise period and a first time point, the rise period extending from the first time point at which an intensity of the reflection-light pulse occurring from the target object due to the light pulse starts increasing to a second time point at which the increasing ends;

causing the light detector to generate a second signal by causing the light detector to detect the reflection-light pulse in a second period after the first period ends, the second period including at least a part of a fall period and a fourth time point, the fall period extending from a third time point at which the intensity of the reflection-light pulse starts decreasing to the fourth time point at which the decreasing ends; and generating data indicating a distance from the light detector to the target object based on the first signal and the second signal and outputting the data, wherein the first period ends prior to a midpoint between the first time point and the fourth time point, and wherein the second period begins later than the midpoint.

15. A non-transitory computer-readable recording medium storing a program for executing a process comprising:

outputting a first light pulse and a second light pulse toward a target object;

causing a light detector to generate a first signal by causing the light detector to detect a first reflection-light pulse in a first period including at least a part of a rise period and a first time point, the rise period extending from the first time point at which an intensity of the first reflection-light pulse occurring from the target object due to the first light pulse starts increasing to a second time point at which the increasing ends;

causing the light detector to generate a second signal by causing the light detector to detect a second reflection-light pulse in a second period including at least a part of a fall period and a fourth time point, the fall period extending from a third time point at which an intensity of the second reflection-light pulse occurring from the target object due to the second light pulse starts decreasing to the fourth time point at which the decreasing ends; and generating data indicating a distance from the light detector to the target object based on the first signal and the second signal and outputting the data, wherein the first period ends prior to a midpoint between the first time point and a time point at which a decrease in the intensity of the first reflection-light pulse ends, and wherein the second period begins later than a midpoint between a time point at which the intensity of the second reflection-light pulse starts increasing and the fourth time point.

* * * * *